(12) United States Patent
Cook

(10) Patent No.: US 8,162,074 B2
(45) Date of Patent: Apr. 24, 2012

(54) ERGONOMIC HAND-HELD POWER TOOL AND METHODS OF USE

(76) Inventor: Bryan C. Cook, Brighton, CO (US)

(*) Notice: Subject to any disclaimer, the term of this patent is extended or adjusted under 35 U.S.C. 154(b) by 0 days.

(21) Appl. No.: 13/142,311

(22) PCT Filed: Mar. 24, 2010

(86) PCT No.: PCT/US2010/028505

§ 371 (c)(1),
(2), (4) Date: Jun. 27, 2011

(87) PCT Pub. No.: WO2011/119153

PCT Pub. Date: Sep. 29, 2011

(65) Prior Publication Data

US 2012/0037386 A1 Feb. 16, 2012

(51) Int. Cl.
*B23B 45/00* (2006.01)

(52) U.S. Cl. ............. 173/1; 173/29; 173/170; 173/171; 16/114.1; 30/296.1; 408/241 R

(58) Field of Classification Search .............. 173/1, 171, 173/141, 170, 29; 408/16, 124, 136, 712, 408/241 R; 30/298, 296.1; 16/115, 426, 16/114.1

See application file for complete search history.

(56) References Cited

U.S. PATENT DOCUMENTS

| | | | | |
|---|---|---|---|---|
| 2,405,110 A | * | 8/1946 | Bullock | ......................... 173/141 |
| 4,830,253 A | * | 5/1989 | Hunter | ............................... 227/8 |
| 4,888,846 A | | 12/1989 | Natale | |
| 4,924,571 A | * | 5/1990 | Albertson | ....................... 30/121 |
| D326,597 S | | 6/1992 | Lee | |
| 5,228,610 A | | 7/1993 | Spence | |
| 5,361,851 A | * | 11/1994 | Fox | ................................ 173/170 |
| 5,445,479 A | | 8/1995 | Hillinger | |
| 5,598,892 A | * | 2/1997 | Fox | ................................ 173/170 |
| 5,716,087 A | | 2/1998 | Backich et al. | |
| 5,890,259 A | | 4/1999 | Sarac | |
| 7,228,917 B2 | * | 6/2007 | Davis et al. | .................... 173/170 |
| 7,258,261 B1 | * | 8/2007 | Reyes | ............................ 227/110 |
| 7,617,885 B2 | * | 11/2009 | Howland | ....................... 173/171 |
| 7,637,882 B2 | | 12/2009 | Carman et al. | |
| 7,788,962 B2 | * | 9/2010 | Chiasson et al. | ............ 72/453.15 |
| 2002/0157215 A1 | | 10/2002 | Carman et al. | |

OTHER PUBLICATIONS

International Search Report for International Application No. PCT/US2010/028505, dated May 31, 2011.
Written Opinion of the International Searching Authority for International Application No. PCT/US2010/028505, dated May 31, 2011.

* cited by examiner

*Primary Examiner* — Scott Smith
(74) *Attorney, Agent, or Firm* — Leyendecker & Lemire, LLC; Terrence M. Wyles, Esq.

(57) ABSTRACT

An ergonomically enhanced electric power tool is disclosed that incorporates a new type of user grip and control system. This grip and control system is housed in a substantially rigid control-housing sheath, which provides enhanced leverage and control over the drilling process while reducing stress on the user's hand, wrist, and arm. The tool motor is disposed substantially in parallel with the user's wrist, but on a different plane, and eliminates the traditional "pistol" type of power-tool grip. The control-housing sheath contains a grip-controller assembly that allows the user to control most major drill operations within the gauntlet-like control-housing sheath. The inventive concepts described can be applied to myriad hand-held power tools, and a detailed example for a power drill is provided.

93 Claims, 14 Drawing Sheets

US 8,162,074 B2

ERGONOMIC HAND-HELD POWER TOOL AND METHODS OF USE

BACKGROUND OF THE INVENTION

Occupational stress on muscular-skeletal systems is a common enemy to health and productivity. Use of ergonomically designed tools is especially important to reduce the incidents of debilitating injuries to joints, fatigue of muscles, as well as injuries to other connective tissues and even nerves (e.g., carpal-tunnel syndrome). Improperly designed hand-held power tools such as drills, grinders, sanders, saws, etc. are typically heavy with unbalanced designs. In turn, typical users, such as those in the construction trades, often need to use such heavy, unbalanced power tools at odd angles and as a result, users put significant stress on key joints such as the wrist, elbow, and shoulder.

In the case of power drills and the like, a user not only must deal with the weight of said power tool, which usually is disposed in a pistol-like shape, but also must deal with fighting the torque generated by the power tool against the user's wrist.

One known attempt to address these issues with regard to power drills is documented in U.S. Pat. No. 5,445,479 to Hillinger (Hillinger). Hillinger discloses an electrically energized hand drill that departs from the traditional "pistol" type of drill and provides hand and lower forearm support to attempt to relieve physical stress on the user. However, the orientation of the aforementioned added support is such that if a user is drilling horizontally into a surface, the user must hold the drill such that the longitudinal axis formed by the curled fingers of the gripping hand is orthogonal to the ground. This is because the lower forearm support is a single rod (with or without padding) that is fixed along the outer side of the user's lower forearm. If the user changes orientation of the drill away from a strict horizontal application, then the user will experience much added stress on portions of the arm and wrist that remain unsupported in these other positions. Furthermore, the Hillinger drill places most of the major components of the drill, including most weight-bearing components, such as the drill motor and battery, in the front of the drill assembly and more importantly in front of the user's hand and/or wrist. Moreover, the actual drill motor and drill bit are substantially within the same longitudinal axis of the user's wrist and forearm. This configuration translates into the need for a user to exert counter-torque as the drill operates, as well as the need for the user to exert more effort than should be necessary to accommodate the excessively front-loaded weight of the Hillinger drill with the user's arm muscles.

Other attempts to address these ergonomic issues include U.S. Pat. No. D326597 to Lee (Lee), which discloses a power wrench with a pistol grip that also includes a lower forearm support bar and strap to help a user support the power tool in a manner very similar to that used for the Hillinger drill. The Lee solution suffers from the same deficiency as the Hillinger drill.

In most existing art, the system for user gripping and manipulation of the power tool provides insufficient leverage to easily overcome the inconvenient weight distribution and power-tool-generated torque to adequately avoid worker body stress and injuries. It would be desirable to have a more-ergonomic system for a user to operate a power tool, while enhancing the leverage a user has over the motorized portion of the tool for control purposes.

DETAILED DESCRIPTION

Overview

Figure 1:
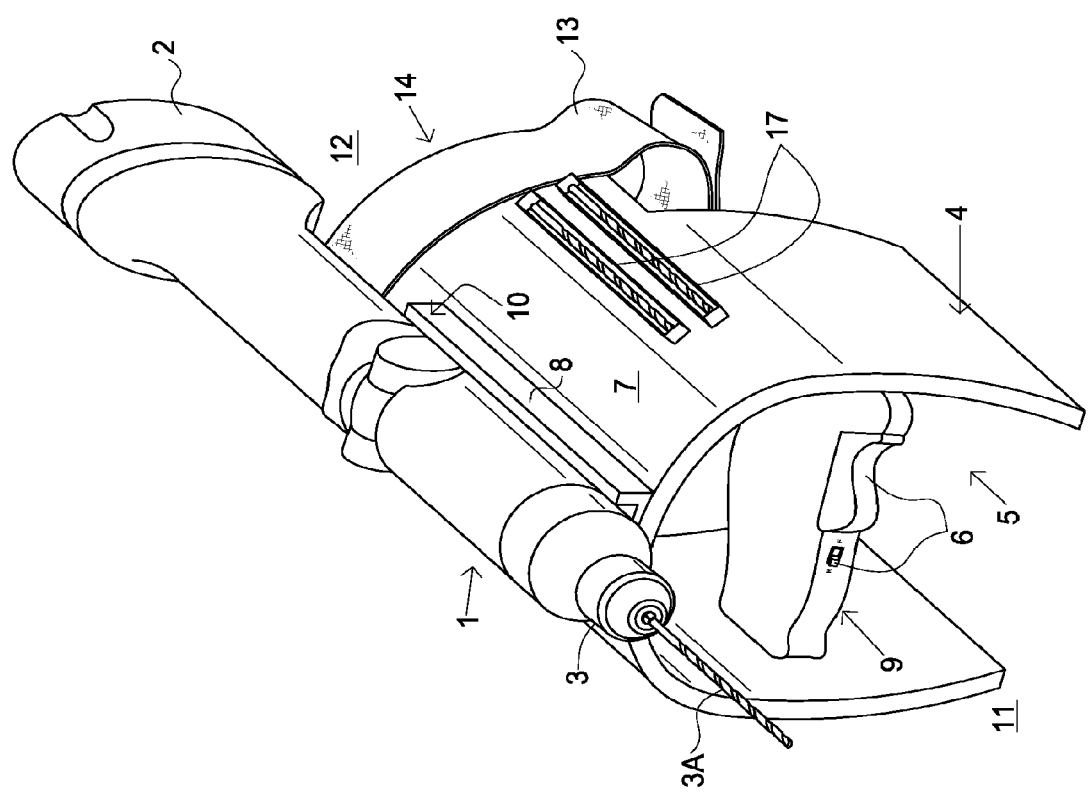
FIG. 1 depicts a left-front isometric view of one embodiment of an ergonomic hand-held power drill, showing a relatively basic configuration minus many options described in the Detailed Description.
Figure 2:
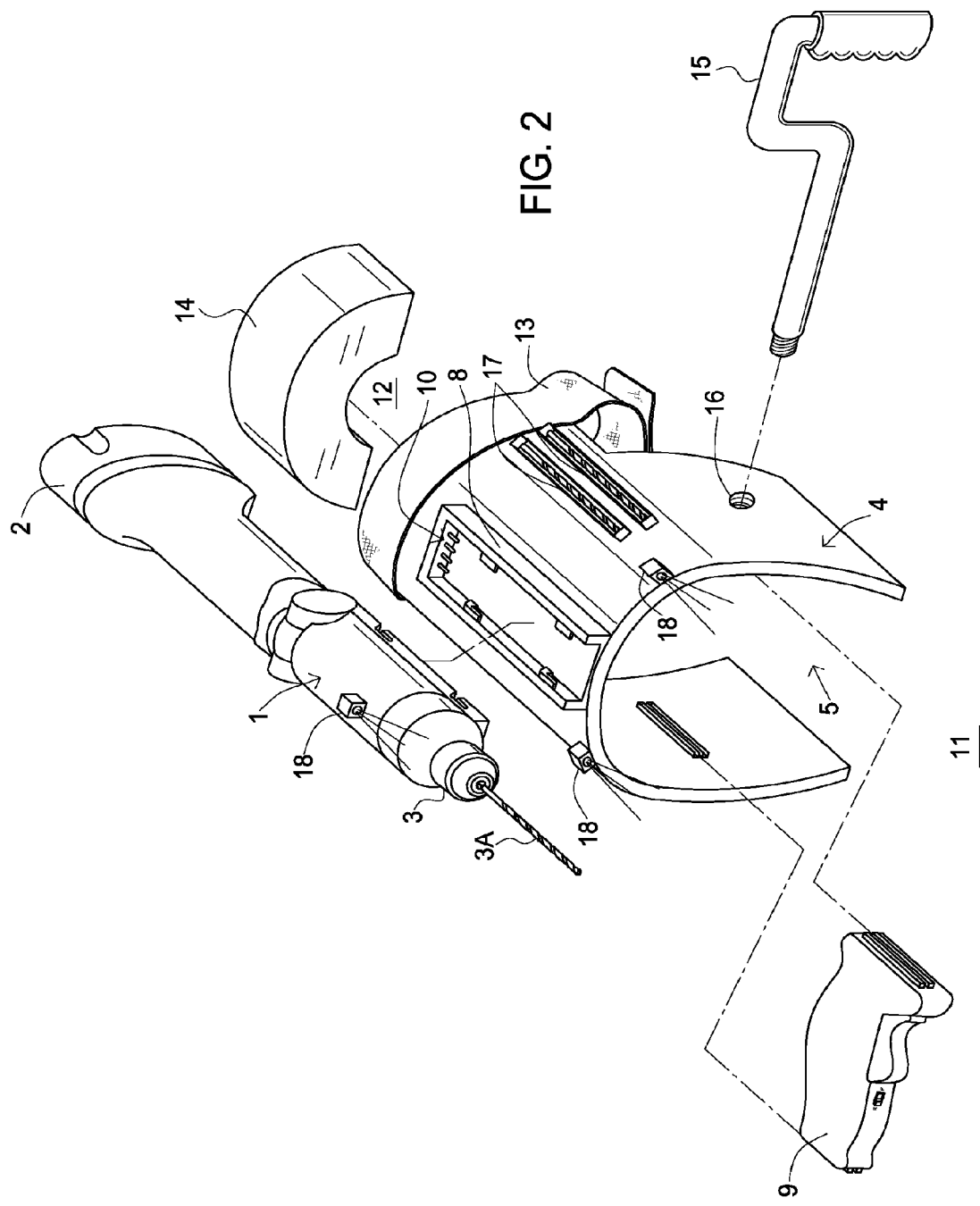
FIG. 2 depicts a right-front exploded isometric view of one embodiment of an ergonomic hand-held power drill, including several options that can be added to the device, as described in the Detailed Description.
Figure 3:
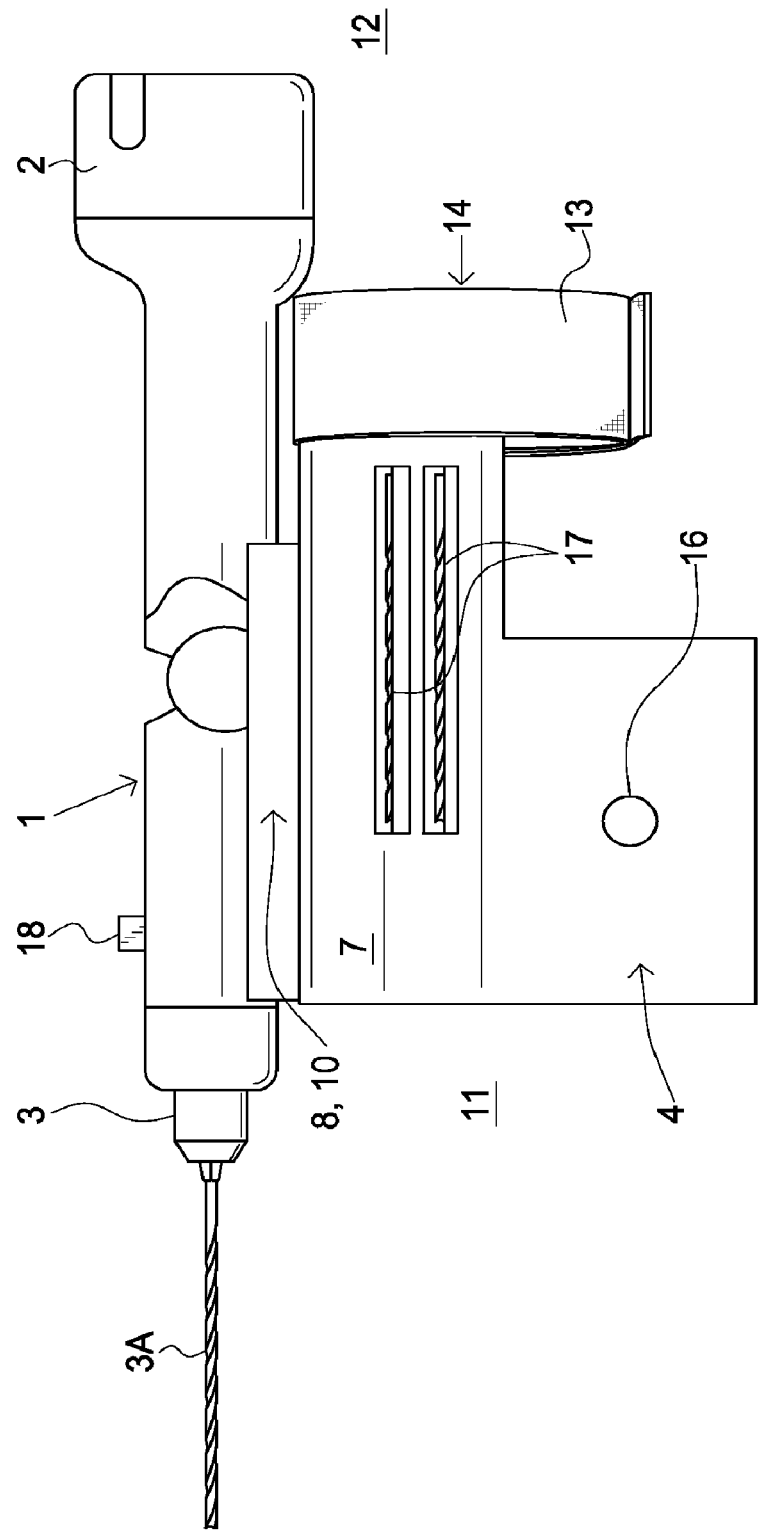
FIG. 3 depicts a left-side view of one embodiment of an ergonomic hand-held power drill.
Figure 4:
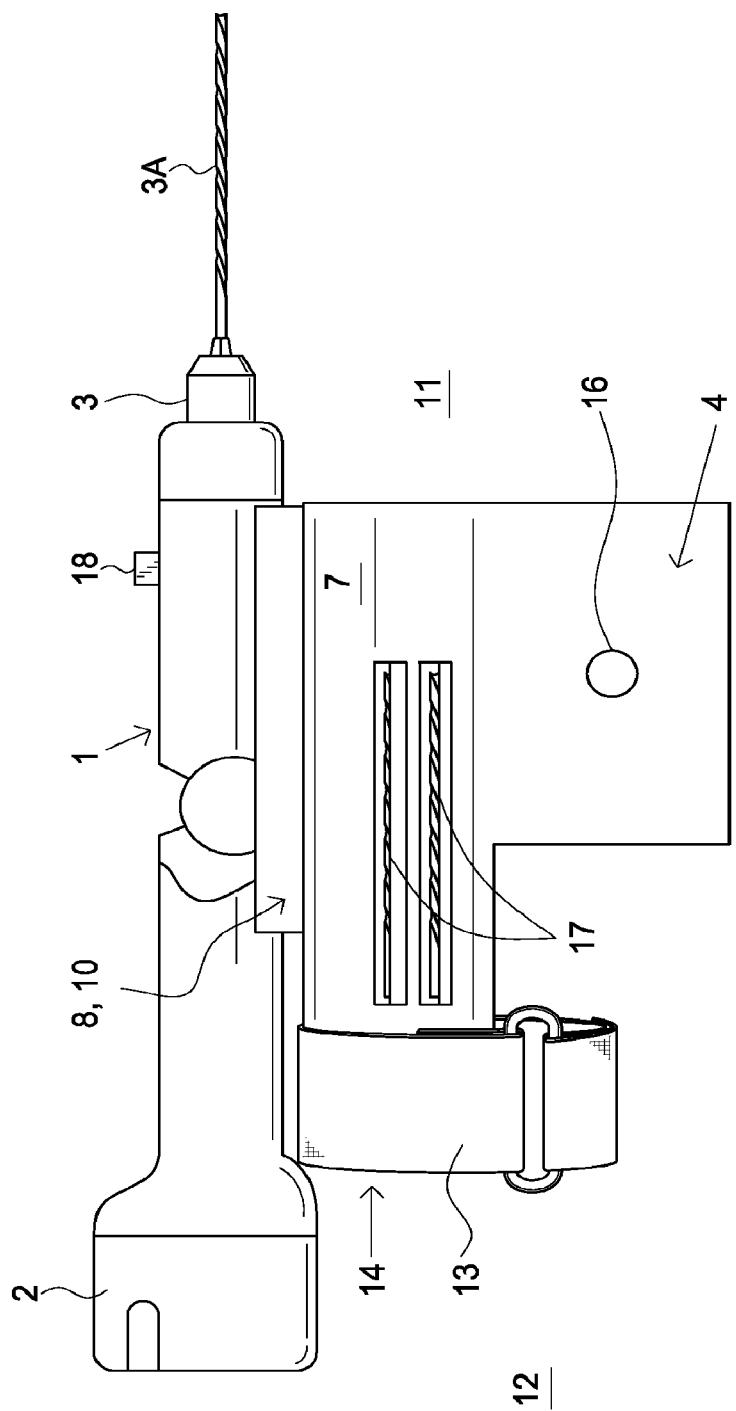
FIG. 4 depicts a right-side view of one embodiment of an ergonomic hand-held power drill.
Figure 5:
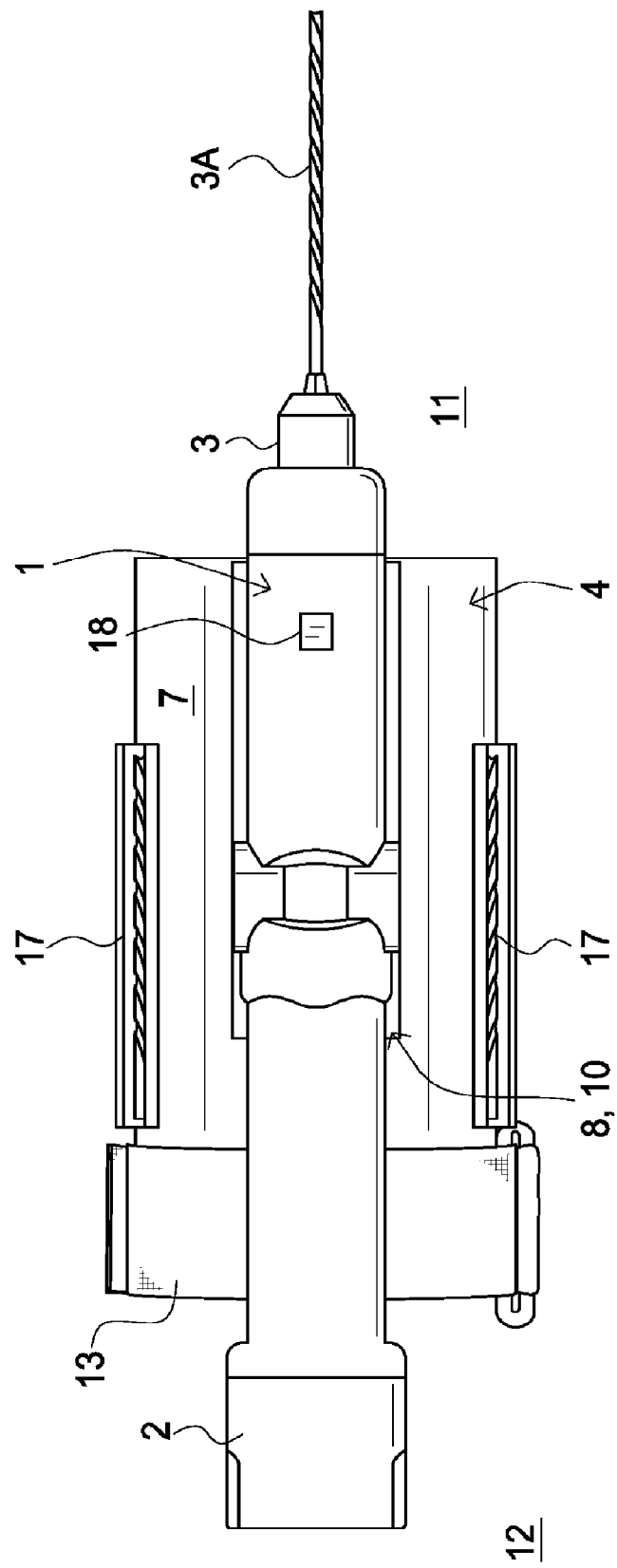
FIG. 5 depicts a top view of one embodiment of an ergonomic hand-held power drill.
Figure 6:
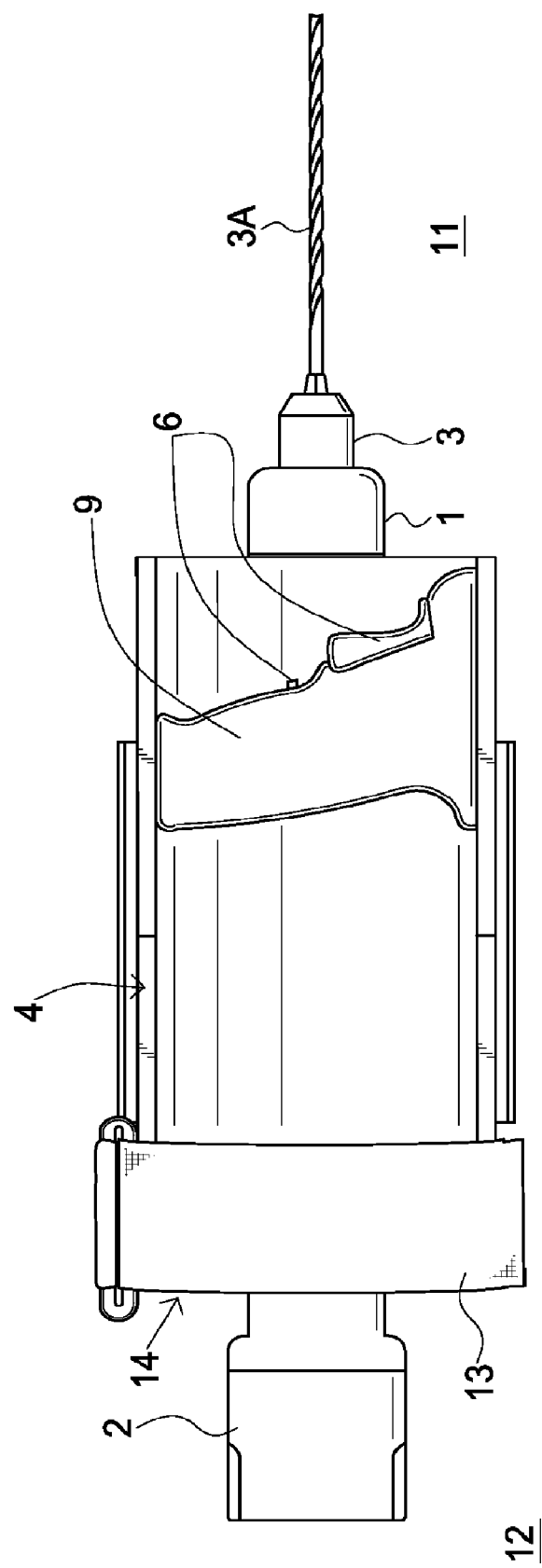
FIG. 6 depicts a bottom view of one embodiment of an ergonomic hand-held power drill.
Figure 7:
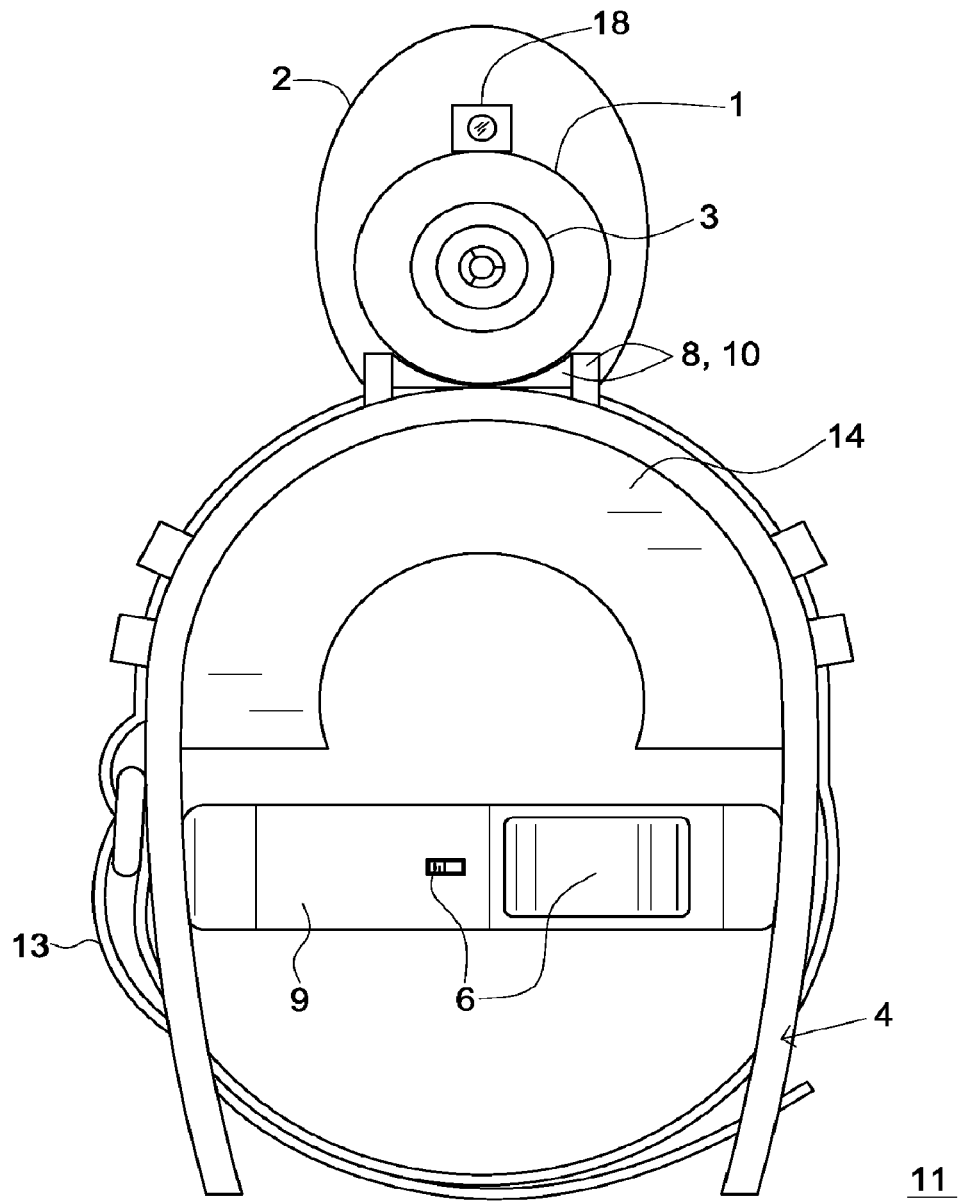
FIG. 7 depicts a front view of one embodiment of an ergonomic hand-held power drill.
Figure 8:
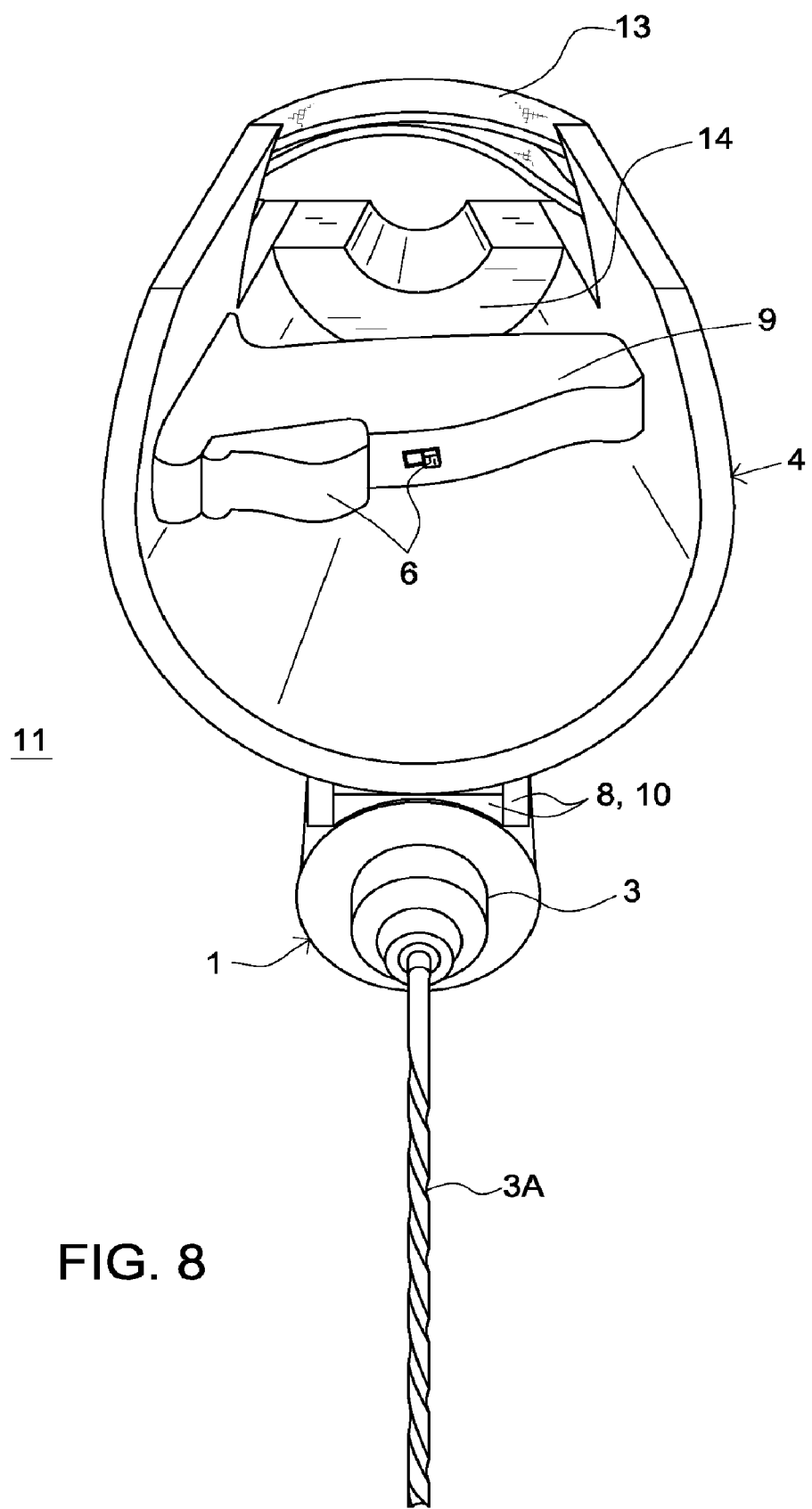
FIG. 8 depicts a front-bottom view of one embodiment of an ergonomic hand-held power drill.
Figure 9:
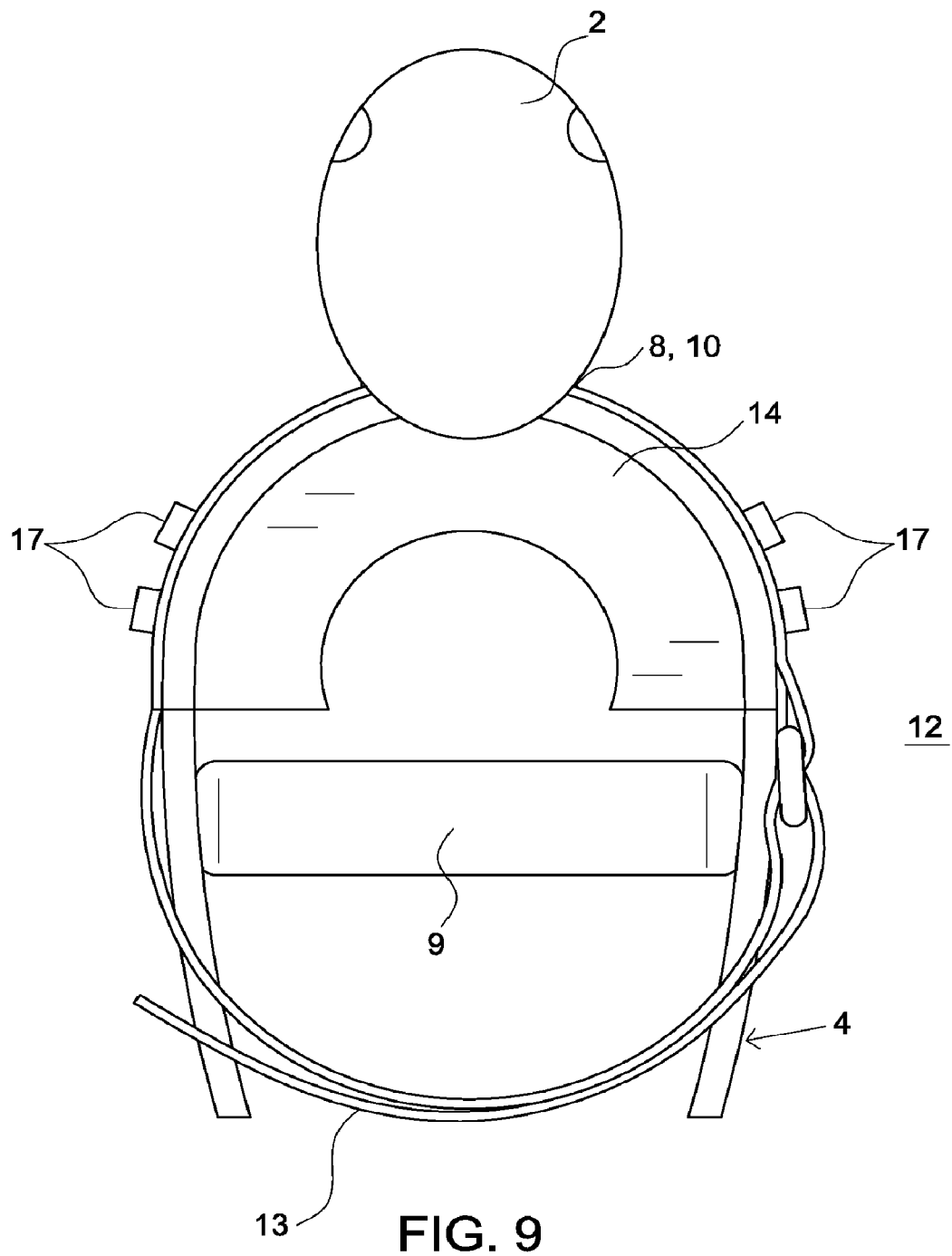
FIG. 9 depicts a rear view of one embodiment of an ergonomic hand-held power drill.
Figure 10:
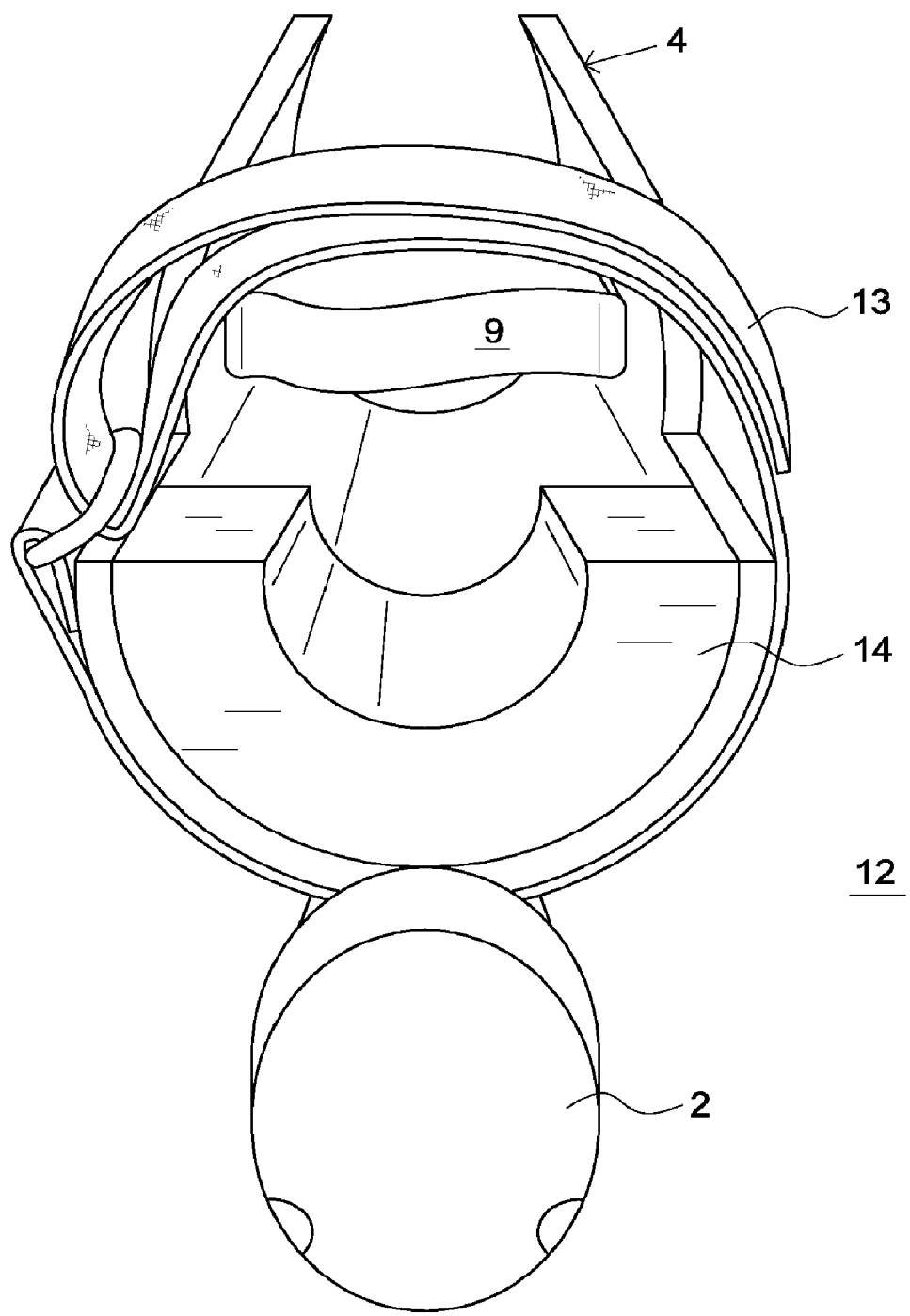
FIG. 10 depicts a rear-bottom view of one embodiment of an ergonomic hand-held power drill.

The present inventive disclosure is directed generally to an ergonomic hand-held power tool, such as an electric power drill, power wrench, power hammer drill, power screwdriver, reciprocating saw, etc. For exemplary purposes only, this description focuses on an electric power drill; however, all of the inventive disclosures and embodiments contained herein are contemplated to also be adapted to use with other types of common power tools, including those powered by electricity, pneumatics, or hydraulics.

Refer to FIGS. 1-14. The ergonomically enhanced electric power drill comprises many components that are common to electric power drills, such as a reversible-direction DC electric motor 1, an electric power supply 2 (that can be by way of a rechargeable battery or by way of an external power supply via a power cord), a drill chuck 3 adapted for receiving a user-selected bit 3A for drilling, screw-driving, or sockethead driving, control circuitry 19 to control power drill operations (including energizing and de-energizing the power drill, controlling the power drill speed and torque, and selecting the forward or reverse operating direction of the power drill).

However, the present ergonomically enhanced electric power drill also incorporates a new type of user grip and control system. This grip and control system is housed in a substantially rigid control-housing sheath 4, which defines an inner volume 5 to house user controls 6 and has an outer surface 7 for the mounting 8 of the power-drill motor. The control-housing sheath 4 has a closed upper region and a lower region that may be open or closed, and for reference purposes, the closed upper region of the control-housing sheath 4 defines the top of the control-housing sheath 4 and the lower region of the control-housing sheath 4 defines the bottom of the control-housing sheath 4. The control-housing sheath 4 is adapted to receive a user's hand and wrist in the inner volume 5, and the control-housing sheath 4 has a grip-controller assembly 9 coupled to the control-housing sheath 4 within the inner volume 5 for the user's hand to grip. The grip-controller assembly 9 is electrically coupled with the power-drill motor 1 and contains portions of the necessary control circuitry 19 (see FIG. 11) to facilitate user control over power-drill operations (e.g., energization operations such as power on/off, direction, speed/torque, and/or drill-work-area light operations, if the drill is so equipped). When in use, the top of the user's gripping hand is oriented toward said top of said control-housing sheath 4, such that the longitudinal axis formed by the curling of the gripping hand fingers is below and orthogonal relative to the longitudinal axis of the power-drill motor 1.

The power-drill motor 1 is adapted to be fixedly mounted 8 and electrically coupled 10 to the outer surface of the top of said control-housing sheath 4, with the drill-chuck 3 end of the power drill pointing away from the user and defining the operating end 11 of said control-housing sheath 4, and with the opposite end of said power drill defining the control end 12 of said control-housing sheath 4.

The user's wrist and/or lower forearm is substantially secured to the control end 12 of the control-housing sheath 4 using a sheath-to-user-arm-securing device 13 (e.g., a hook-and-loop strap configuration, a buckle and strap configuration, or other strap configuration with a quick-release capability), which also can include padding 14 to enhance user comfort and the security of the fit. When the user's hand and wrist are engaged with the control-housing sheath 4, including the grip-controller assembly 9, the axis of the combination of the user's hand and wrist is on a different, yet substantially parallel axis as that of the mounted power-drill motor 1. This provides enhanced leverage to the user to control the power drill during operation, as the user can exert directional force of the power drill using the control-housing sheath 4 and the grip-controller assembly 9.

When worn by a user, the entire assembly for the ergonomically enhanced electric power drill can resemble, in many embodiments, a gauntlet, albeit with mechanical/robotic components attached. The gauntlet-like look arises from the protective and structurally supporting control-housing sheath 4 previously discussed. In addition to the practical and useful aspects of such a configuration and appearance, as discussed above, this robo-gauntlet look has a certain aesthetic appeal to many consumers, especially men.

Various enhancements to the basic embodiment are possible to add functionality and comfort for the user. For example, in some embodiments, the grip-controller assembly 9, which by itself in some embodiments can resemble the pistol-grip portion of a typical electric power drill, is readily detachable and can be reversed in position in order to facilitate the change from a right-handed user to a left-handed user. The proper electrical control-circuit connections are maintained whether the power drill is in a right-handed mode or a left-handed mode (see FIG. 11). Another example of a potential enhancement is the attachment of a stabilizer handle 15 coupled to an outside lateral surface of the control-housing sheath 4. In some embodiments, this stabilizer handle 15 can be installed on either side of the control-housing sheath 4, depending on whether the user is right-handed or right-handed when using the grip-controller assembly 9, thereby using the opposite hand to grip the stabilizer handle 15. Still in other variations, the control-housing sheath 4 is lined with specialized padding 14 to enhance user comfort and to help ensure a secure fit with the user's wrist and lower forearm. Finally, the unique nature of the control-housing sheath 4 provides substantial and convenient locations to hold multiple drill-work-area illumination lamps 18 (e.g., LEDs), forming a lamp array of sorts, which can be more effective than single-lamps found on some power tools in the art. Of course, an illumination lamp 18 can also be mounted directly on the drill-motor housing 1.

Terminology

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", and similar terms, as used in this patent application specification (including the claims and drawings), refer to structures that can be uncoupled from an adjoining structure with relative ease (i.e., non-destructively and without a complicated or time-consuming process) and can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly to aid in the description of the various embodiments, and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "sheath", as used in reference to the term "control-housing sheath", refers to the housing apparatus for the user hand-grip controls (also referred to herein as the "grip-controller assembly") of the hand-held power-tool devices described herein. This sheath-like housing apparatus provides a means of structurally supporting various components of an attached power tool, including the control circuitry, and also provides a means to protect a user's controlling hand, wrist, and lower arm as the power tool is used. A "sheath" in this context is generally closed to the environment on the sides of the user hand grip However, in some embodiments, the sheath can have openings on the sides (i.e., an open framework), although this type of configuration affords less protection to a user's hand and wrist. A "sheath" also is generally open to the environment on each end, with one end being the "control end" where the user inserts the user's hand, and the other end being the "operating end", which corresponds to the application side of the power tool. However, in some embodiments, the "operating end" of the sheath can be closed or substantially closed in order to afford more protection to the user's controlling hand.

First Embodiment

An Ergonomic Hand-Held Power Drill

This embodiment is directed generally to an ergonomic hand-held power tool, such as an electric power drill, power wrench, power hammer drill, power screwdriver, reciprocating saw, etc. For exemplary purposes only, this description focuses on an electric power drill; however, all of the inventive disclosures contained herein are contemplated to also be adapted to use with other types of common power tools, including those powered by electricity, pneumatics, or hydraulics.

Refer to FIGS. 1-14. The ergonomically enhanced electric power drill comprises many components that are common to electric power drills, such as a reversible-direction DC electric motor 1, an electric power supply 2 (that can be by way of a rechargeable battery or by way of an external power supply via a power cord), a drill chuck 3 adapted for receiving a user-selected bit 3A for drilling, screw-driving, or sockethead driving, control circuitry 19 to control power drill operations (including energizing and de-energizing the power drill, controlling the power drill speed and torque, and selecting the forward or reverse operating direction of the power drill).

However, the present ergonomically enhanced electric power drill also incorporates a new type of user grip and control system. This grip and control system is housed in a substantially rigid control-housing sheath 4, which defines an inner volume 5 to house user controls 6 and has an outer surface 7 for the mounting 8 of the power-drill motor. The control-housing sheath 4 has a closed upper region and a lower region that may be open or closed, and for reference purposes, the closed upper region of the control-housing sheath 4 defines the top of the control-housing sheath 4 and the lower region of the control-housing sheath 4 defines the bottom of the control-housing sheath 4.

The substantially rigid control-housing sheath 4 can be comprised of any suitable composite material, polymer, fiberglass, graphite, or even a relatively light-weight metal, such as an aluminum alloy. It is contemplated that a light-weight, non-metallic composite material is best suited for the apparatus, since weight is a major consideration for ease of use. The control-housing sheath 4 may further be covered and/or coated with a protective material, including any combination of plastic, leather, and the like. It should be noted that in some embodiments, the control-housing sheath 4 can have an open framework along the sides, as opposed to a relatively closed wall along the sides. The advantage of an open framework along the sides is primarily one of weight reduction for the overall hand-held tool. However, many users would probably prefer the closed-side version of the control-housing sheath 4 because the closed sides offers a level of protection for the user's hand and wrist.

The control-housing sheath 4 is adapted to receive a user's hand and wrist in the inner volume 5, and the control-housing sheath 4 has a grip-controller assembly 9 coupled to the control-housing sheath 4 within the inner volume 5 for the user's hand to grip. The grip-controller assembly 9 is electrically coupled with the power-drill motor 1 and contains portions of the necessary control circuitry 19 (see FIG. 11) to facilitate user control over power-drill operations (e.g., power on/off, direction, speed/torque, and/or drill-work-area light operations, if the drill is so equipped). When in use, the top of the user's gripping hand is oriented toward said top of said control-housing sheath 4, such that the longitudinal axis formed by the curling of the gripping hand fingers is below and orthogonal relative to the longitudinal axis of the power-drill motor 1.

The power-drill motor 1 is adapted to be fixedly mounted 8 and electrically coupled 10 to the outer surface of the top of said control-housing sheath 4, with the drill-chuck 3 end of the power drill pointing away from the user and defining the operating end 11 of said control-housing sheath 4, and with the opposite end of said power drill defining the control end 12 of said control-housing sheath 4.

The user's wrist and/or lower forearm is substantially secured to the control end 12 of the control-housing sheath 4 using a sheath-to-user-arm-securing device 13 (e.g., a hook-and-loop strap configuration, a buckle and strap configuration, or other strap configuration with a quick-release capability, such as a ratchet strap with a quick-release device), which also can include padding 14 to enhance user comfort and the security of the fit. When the user's hand and wrist are engaged with the control-housing sheath 4, including the grip-controller assembly 9, the axis of the combination of the user's hand and wrist is on a different, yet substantially parallel axis as that of the mounted power-drill motor 1. This provides enhanced leverage to the user to control the power drill during operation, as the user can exert directional force of the power drill using the control-housing sheath 4 and the grip-controller assembly 9.

When worn by a user, the entire assembly for the ergonomically enhanced electric power drill can resemble, in many embodiments, a gauntlet, albeit with mechanical/robotic components attached. The gauntlet-like look arises from the protective and structurally supporting control-housing sheath 4 previously discussed. In addition to the practical and useful aspects of such a configuration and appearance, as discussed above, this robo-gauntlet look has a certain aesthetic appeal to many consumers, especially men.

Various enhancements to the basic embodiment are possible to add functionality and comfort for the user. For example, in some embodiments, the grip-controller assembly 9, which by itself in some embodiments can resemble the pistol-grip portion of a typical electric power drill, is readily detachable and can be reversed in position in order to facilitate the change from a right-handed user to a left-handed user. The proper electrical control-circuit connections are maintained whether the power drill is in a right-handed mode or a left-handed mode (see FIG. 11).

Another example of a potential enhancement is the attachment of a stabilizer handle 15 coupled to an outside lateral surface of the control-housing sheath 4. In some embodiments, this stabilizer handle 15 (shown in FIG. 2) can be installed on either side of the control-housing sheath 4, depending on whether the user is right-handed or right-handed when using the grip-controller assembly 9, thereby using the opposite hand to grip the stabilizer handle 15. The stabilizer handle 15 can be a simple longitudinal handle that extends orthogonally from the control-housing sheath 4, wherein the user's opposite hand grip is oriented substantially on the same longitudinal axis as with the user's other hand grip on the grip-controller assembly 9. However, given the orientation of the user's hand and wrist within the control-housing sheath 4, some users would find it more advantageous for the stabilizer handle 15 to include a grip at the distal end relative to the control-housing sheath 4 such that the user's free hand can grip the stabilizer handle 15 in a manner that puts that hand substantially orthogonal in orientation as compared to the hand gripping the grip-controller assembly 9 within the control-housing sheath 4 (for example, a "T" handle grip or something similar in orientation). Having this latter type of stabilizer handle 15 grip allows for user control to overcome torque forces along multiple axes.

In some embodiments, the stabilizer handle 15 is attached to the control-sheath housing 4 by threading the stabilizer handle 15 into a threaded receiving hole in the control-housing sheath 4. In other embodiments, the stabilizer handle 15 is coupled to the control-housing sheath 4 using a quick-release fastener type such as a ¼-turn or ½-turn, self-ejecting fastener configuration. In yet more embodiments, the stabilizer handle 15 is coupled to the control-housing sheath 4 by a bolt or screw inserted from the inside of the control-housing sheath 4, then threading the stabilizer handle 15, which has a threaded receiving hole, onto the male threads of the bolt or screw.

Still in other variations, the control-housing sheath 4 is lined with specialized padding 14 to enhance user comfort and to help ensure a secure fit with the user's wrist and lower forearm. Generally, the padding is mostly needed in the area of the control-housing sheath 4 that surrounds the user's wrist and lower forearm; however, additional padding can be incorporated in other areas within the control-housing sheath 4 if desired; for example, padding might be lined at the top of the interior of the control-housing sheath 4, which would make the top of the user's hand feel more comfortable.

The padding 14 can be comprised of any of many materials commonly used in industry for such purposes. Such candidate materials include various polymer foam materials, including latex, visco-elastic foam, plastic, and polymer. Other materials that can be used include orthopedic felt, moleskin padding, natural fiber, synthetic fiber, and a gel layer. Typically, a gel layer would be comprised of a silicone gel, a PVC gel, a polyorganosiloxane gel, a NCO-prepolymer gel, a polyol gel, a polyurethane gel, a polyisocyanate gel, or a gel including a pyrogenically produced oxide. Further, foam padding can be integrated with thermosetting material such as gel-type elastomers. For example, the padding materials used can include a visco-elastic having a gel-like property such as polyurethane, a polyvinyl chloride, or a silicone material.

Other embodiments allow for the fixedly mounting of the power-drill motor 1 on the control-housing sheath 4 employs a detachable and re-attachable coupling device 8, 10 to facilitate convenient user selection and use of power-drill motors of different power ratings. Such coupling and recoupling of the power-drill motor 1 can be facilitated by several means. For example, the physical mounting can be by way of formed flange edges disposed on the bottom of the power-drill motor 1 housing that mate with slots disposed at the top of the control-housing sheath 4. When slid completely into position, the power-drill motor 1 can be locked into place, perhaps with a spring-loaded locking/release pin/latch. In addition, when fully in its installed position, the power-drill motor's 1 electrical connections are also properly mated with the control circuitry 19 housed in the entire assembly. In addition, in some embodiments, such a coupling scheme can also allow a user to detach a drill motor 1 from the control housing sheath 4 and then, assuming said detached power-drill motor 1 is designed to house its own controls independent from the control-housing sheath 4, the user can use the detached power drill for specialized circumstances (such as orienting the power drill into areas where the entire power drill assembly with the control-housing sheath 4 would not fit.

In another embodiment, the fixed mounting 8 of the power-drill motor 1 on the control-housing sheath 4 can employ fasteners of continuous or discrete types. Examples of continuous fasteners that might be used include metallic or thermoplastic welds, adhesives, tapes, gluing, soldering, brazing, or other process that does not substantially change the composition of the substrate of the control-housing sheath 4 or the power-drill motor 1 mounts. Examples of discrete fasteners include friction-types such as bolts, screws, studs with nuts, as well as non-friction-types such as rivets or clamps.

An alternative embodiment of the present device makes the grip-controller assembly 9 easily detachable and reattachable in a reverse/mirror position in order to facilitate the use by either a right-handed or left-handed person. Moreover, when the grip-controller assembly 9 is reversed in position, the proper electric coupling of the grip-controller assembly 9 remains enabled even when the physical position has been reversed to accommodate either a right-handed user or a left-handed user. See FIG. 11, which illustrates a simplified basic diagram of this electrical coupling schema, and its relationship to the control circuitry 19.

In an embodiment, the grip-controller assembly 9 physical coupling is comprised of at least one spring-loaded, interlocking latch on each end of the grip-controller assembly 9, wherein each interlocking latch is adapted to mate with an associated receiver slot within the lateral internal sides of the control-housing sheath 4 in order to facilitate a secure physical coupling of the grip-controller assembly 9.

In other embodiments, the grip-controller assembly 9 is physically coupled by employing at least one fastener of the continuous and discrete type, which types have been discussed above.

In another embodiment, the non-control surfaces of the grip-controller assembly 9 are covered or coated with a thin padding material (such materials are discussed above) to enhance user comfort and gripping capability.

Figure 11:
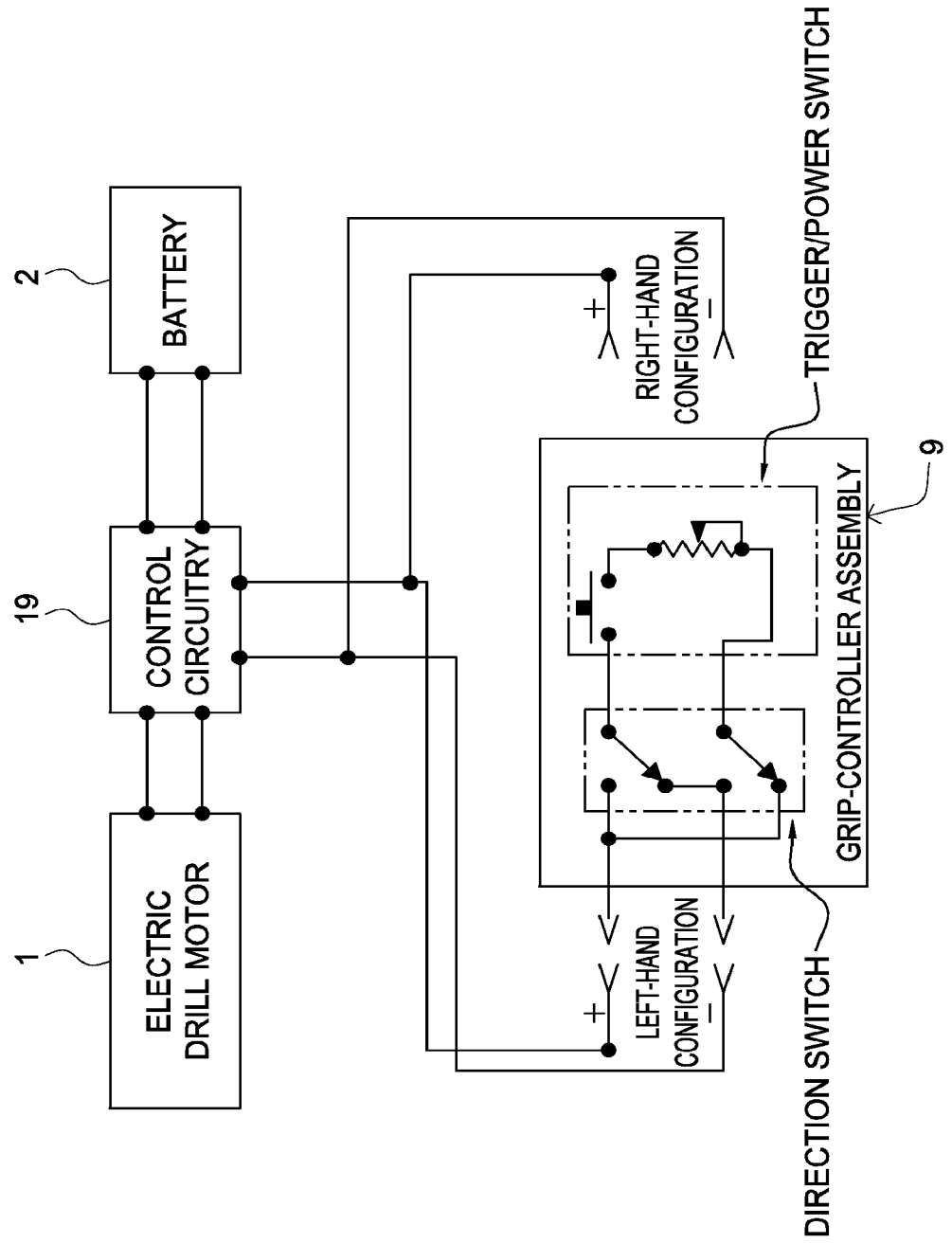
FIG. 11 depicts a simplified block diagram of one embodiment of an electrical coupling between the grip-controller assembly and the balance of the power-drill control circuitry.
Figure 12:
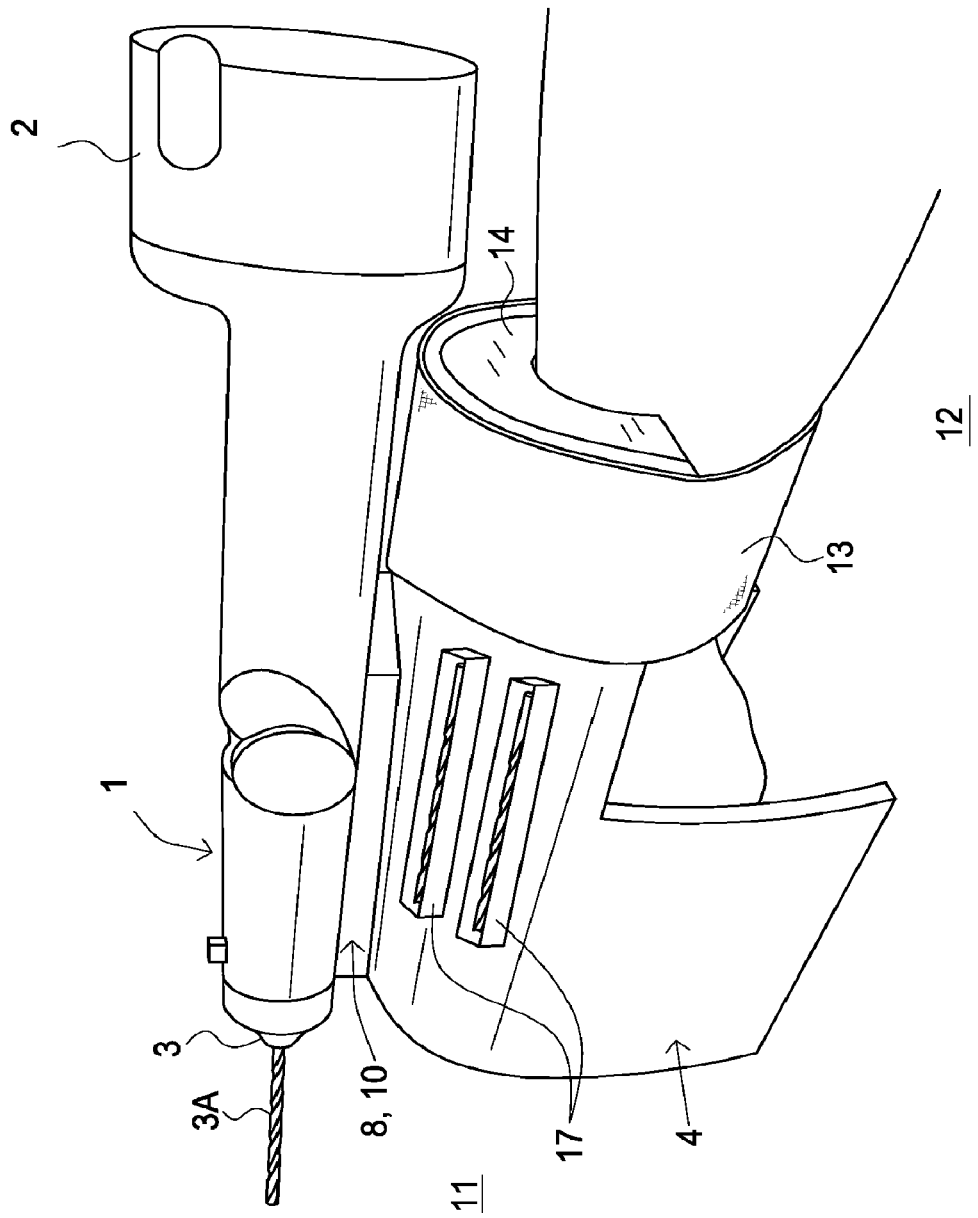
FIG. 12 depicts a left-rear view of one embodiment of an ergonomic hand-held power drill engaged with a user hand.
Figure 13:
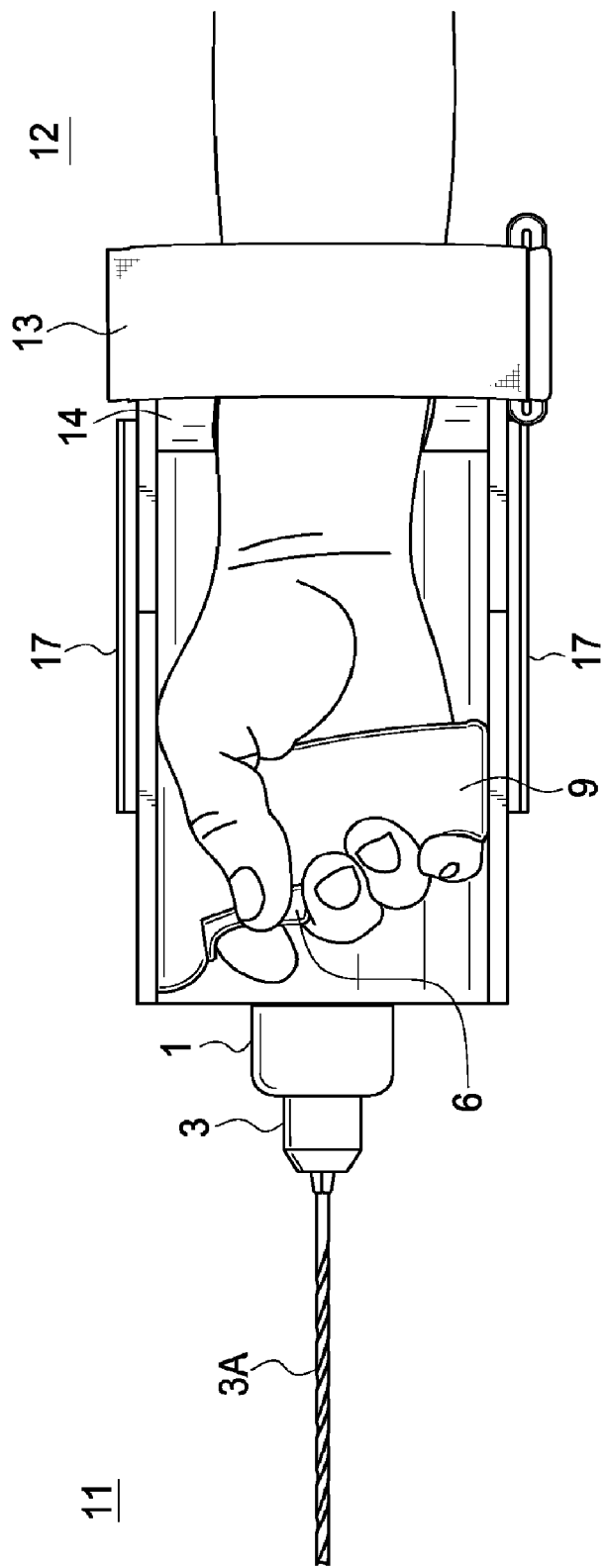
FIG. 13 depicts a bottom view of one embodiment of an ergonomic hand-held power drill engaged with a user hand.
Figure 14:
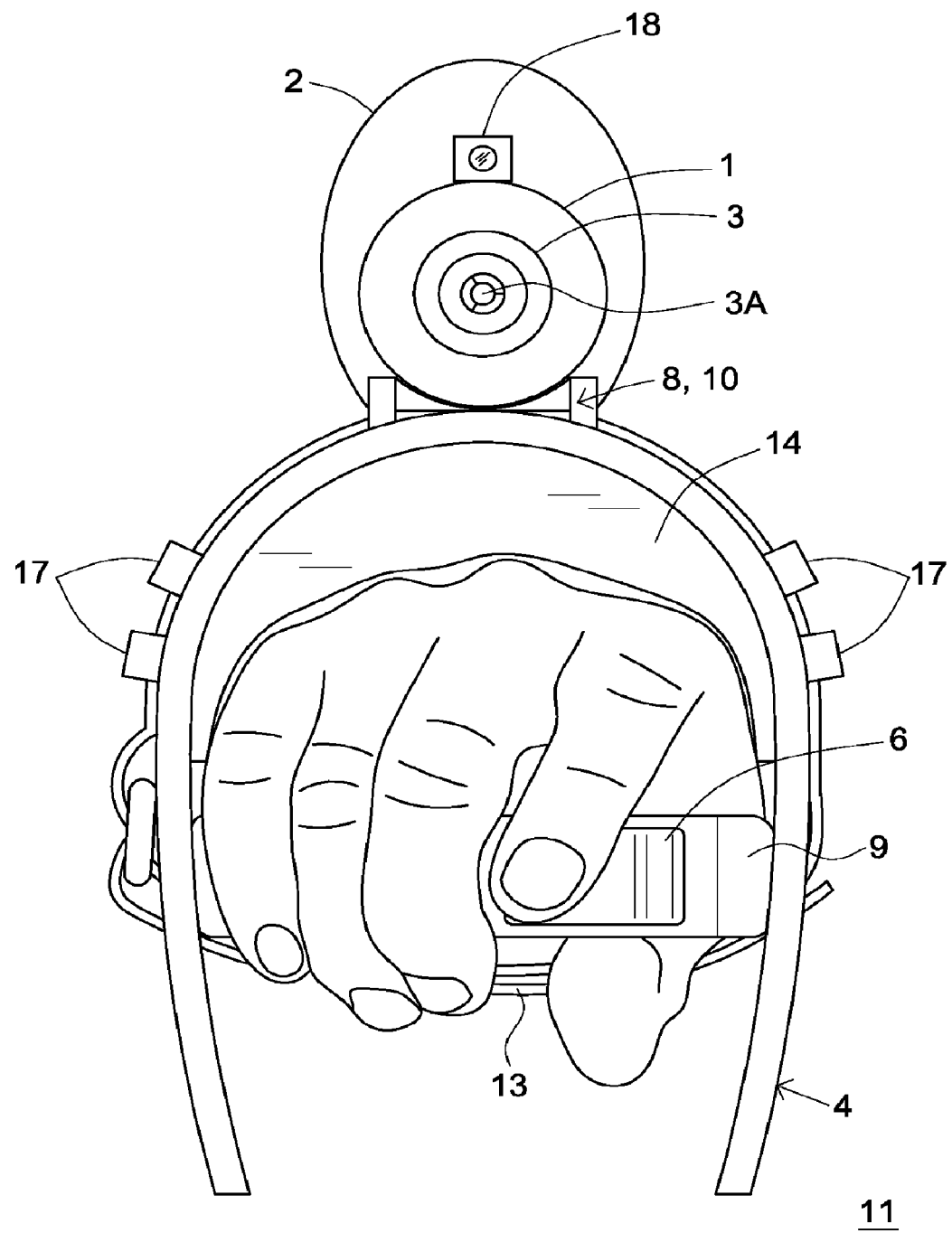
FIG. 14 depicts a front view of one embodiment of an ergonomic hand-held power drill engaged with a user hand.

In yet other embodiments, the controls 6 housed by the grip-controller assembly 9 comprise a trigger-type of switch located to be engaged by the user's index or middle finger, wherein the trigger-type of switch is spring-loaded, although other types of mechanical biasing of the trigger switch can be used. When the trigger-type switch is depressed, the power drill is energized, and as the trigger-type switch is further depressed, the amount of power delivered to the drill motor 1 is increased, thus increasing the speed and torque of the operating power drill. In addition, in some embodiments, the directional control 6 for the power drill is also disposed on the grip-controller assembly 9, and is comprised of a simple switch that redirects the power to be delivered to the drill motor 1, as depicted in FIG. 11. This directional-control switch 6 can be of a two-position rocker type in many embodiments.

Other alternate embodiments, the controls 6 on the grip-controller assembly 9 comprise two spring-loaded variable switches, one disposed on each end of the grip-controller assembly 9. In this embodiment, the variable switch located nearest the index-finger end of the grip-controller assembly 9 controls the power drill operations in the forward direction when depressed, while the variable switch located nearest the ring-finger end of the grip-controller assembly 9 controls the power drill operations in the reverse direction when depressed. Of course, it is also contemplated that the forward-reverse operations controls between these two variable switches can be manufactured to be in the opposite configuration.

In still another embodiment, the trigger-type switch 6 can be a spring-loaded, "rocker' type variable switch, wherein when one side of the rocker is depressed, the power drill is energized in the forward direction at a speed that increases as the rocker switch is further depressed. Conversely, when that same rocker is depressed on the opposite side, the power drill is energized in the reverse direction at a speed that increases as the rocker is further depressed.

In other embodiments, the directional switch 6 on the grip-controller assembly 9 is located on the bottom side of the grip-controller assembly 9 such that the user can easily change the operating direction of the power drill by engaging the user's thumb with the directional switch 6 and changing the position of the switch.

For additional stability for the user during power-drill operations, some embodiments incorporate a stabilizer handle 15 (see FIG. 2) coupled to an outside lateral surface of the control-housing sheath 4. This stabilizer handle 15 is typically screwed into a receiving hole 16 on the side of the control-housing sheath 4, though other means of coupling the stabilizer handle 15 to the control-housing 4 sheath may be used. For example, a bell chuck and set-screw assembly, or a multi-jaw chuck assembly, disposed on the side of the control-sheath housing 4 that is designed to receive the non-grip end of the stabilizer handle 15 may be used, or any other coupling assembly that facilitates a quick-disconnect and reconnect of the stabilizer handle 15. In a typical embodiment, the stabilizer handle 15 is a single rod substantially covered with a hand grip or gripping material (such as any of a number of padding materials previously discussed above). A user grips the stabilizer handle 15 with the hand not already engaged with the grip-controller assembly 9. In an alternate embodiment, the stabilizer handle 15 can be readily coupled to either the right or left side of the control-housing sheath 4, as a user requires.

In some embodiments, the power drill is electrically powered using a rechargeable, readily detachable battery 2, which is normally coupled to the power-drill motor 1 housing. However, it should be appreciated that the battery 2 used by the power drill can be configured to be coupled physically and electrically to a variety of locations on and around the control-housing sheath 4. The rating of the battery 2 is dependent on the rating of the power-drill motor 1 that is coupled to the control-housing sheath 4. In other variations of this power drill, the power drill receives power from an external electrical-power source via an electrical-power cord, commonly via an AC-to-DC power adapter.

In still further variations, the control-housing sheath 4 provides much usable surface area that can be used to mount at least one holder 17 for one or more additional drill bit, screwdriver bit, and/or socket-head bit, as each holder 17 acts as a convenient receiver for spare bits.

In some embodiments, the power-drill assembly incorporates one or more work/drilling-area lamp(s) 18 physically disposed at the operating end 5 of the control-housing sheath 4. If installed, the lamp(s) is (are) electrically coupled to the aforementioned control circuitry 19 and in some embodiments, can be turned on and off by the user using a control on the grip-controller assembly 9. In other embodiments, the lamp(s) 18 is (are) controlled by a discrete switch located on the outside of the control-housing sheath 4. In some embodiments, the lamp(s) 18 automatically illuminates when the drill motor 1 is energized. The lamp(s) 18 can be located anywhere on the power-drill assembly as long as its location provides for illumination of the drilling area; for example, the lamp(s) could be located on the operating end 11 of the control-housing sheath 4 or on top of the power-drill motor 1 housing. The lamp(s) 18 can be of incandescent or and light-emitting-diode (LED) type. In one embodiment, an array of two or more lamps is used, wherein the lamps of the array are disposed along the operating end of the control-housing sheath 4, preferably equally distributed on the opposite sides of the drill motor 1. In addition, the array of lamps can include a lamp disposed on the drill motor 1 housing itself. Such a lamp array provides ample and convenient illumination of the work area around the power drill. It should be noted that the aforementioned term, "array of two or more lamps" is intended to denote a system of lamps acting in concert to illuminate the drill-work area, and is not intended to indicate that each of the lamps 18 in the array are necessarily part of a discrete electrical string of lamps or that the lamps within the array 18 are directly electrically coupled in any way, though they can be. In fact, in some embodiments, some, all, or none of the lamps in the array 18 may be illuminated during drill operations, according to user preferences and the user operation of the associated lamp control, which is disposed either on or in the control-housing sheath 4 or perhaps on the grip-controller assembly 9.

Finally, it should be appreciated by those ordinarily skilled in the art that the basic inventive concept of mounting an electric power drill on a gauntlet-like control-housing sheath 4 as described herein can easily be adapted to myriad other types of power tools, resulting in very similar benefits to the users of those power tools. Moreover, it should be appreciated that the detachable coupling of the power-drill motor 1, which facilitates easy change-outs of such motors, can be applied to power tools in general, even to the extent that the grip-controller assembly 9 and the control-housing sheath 4 can be adapted to receive and control varied types of hand-held power tools, not just drills.

Second Embodiment

An Ergonomic Hand-Held Power Tool

This embodiment is directed generally to an ergonomic hand-held power tool, such as an electric power drill, power wrench, power hammer drill, power screwdriver, reciprocating saw, etc.

Refer to FIGS. 1-14. The ergonomically enhanced power tool comprises a power tool; the power tool being electrically powered; the power tool having an electric motor 1; said power tool having an electric power supply 2; the power tool having control circuitry 19 to control power tool operations, including energizing and de-energizing said power tool; the power tool comprising: a substantially rigid control-housing sheath 4 defining an inner volume to house user controls 6 and having an outer surface for the mounting of the power-tool motor 1, wherein the control-housing sheath 4 has a closed upper region and has a lower region, wherein the closed upper region of the control-housing sheath 4 defines the top of the control-housing sheath 4 and the lower region of the control-housing sheath 4 defines the bottom of the control-housing sheath 4, and wherein the control-housing sheath 4 is adapted to receive a user's hand and wrist in said inner volume; a grip-controller assembly 9 mechanically coupled to the control-housing sheath 4 within said inner volume for a user's hand to grip, wherein the grip-controller assembly 9 is adapted to be electrically coupled with the power-tool motor 1 and contains portions of said control circuitry 19 to facilitate user control over the power-tool energizing operations, and wherein the grip-controller assembly 9 is oriented such that when a user's hand is engaged with said grip-controller assembly 9, the top of a user's gripping hand is oriented toward said top of said control-housing sheath 4, a device 8, 10 adapted to mechanically and electrically receive and couple to said power-tool motor 1, which is adapted to mate with said mechanical and electrical coupling device, wherein said device 8, 10 adapted to mechanically and electrically receive and couple to a power-tool motor 1 is disposed at the top of the control-housing sheath 4; and a sheath-to-user-arm-securing device 13 that adapts the control-housing sheath to be able to substantially secure the wrist and/or lower forearm of a user to the control end 12 of the control-housing sheath 4, wherein when a user's hand and wrist are engaged with the control-housing sheath 4, including the grip-controller assembly 9, the axis of the user's hand and wrist is on a different, yet substantially parallel axis as that of the mounted power-tool motor 1 with the user's engaged hand and wrist substantially located directly below the coupled power-tool motor 1; whereby a user can exert directional force of the power tool using the control-housing sheath 4 and said grip-controller assembly 9.

This embodiment can be further extended wherein the mechanical and electrical coupling 8, 10 of the power-tool motor 1 on the control-housing sheath 4 employs a detachable and re-attachable coupling device to facilitate convenient user selection and use of power-tool motors of different power ratings and/or types.

This embodiment can be further extended wherein the mechanical coupling of the power-tool motor 1 on the control-housing sheath b4 employs at least one fastener of a type selected from the list consisting of continuous and discrete.

This embodiment can be further extended wherein the grip-controller assembly 9 has controls to allow a user's gripping hand to control power-tool energization.

This embodiment can be further extended wherein the mechanical coupling of the grip-controller assembly 9 is readily detachable, re-attachable, and reversible in position such that the grip-controller assembly 9 can be used by either a right-handed or left-handed user, and wherein the electric coupling of the grip-controller assembly 9 remains enabled even when the physical position has been reversed to accommodate either a right-handed user or a left-handed user.

This embodiment can be further extended wherein the grip-controller assembly 9 mechanical coupling employs at least one fastener of a type selected from the list consisting of continuous and discrete.

This embodiment can be further extended wherein the grip-controller assembly 9 mechanical coupling further comprises at least one spring-loaded, interlocking latch on each end of said grip-controller assembly, and wherein each interlocking latch is adapted to mate with an associated receiver slot within said lateral internal sides of the control-housing sheath 4 in order to facilitate a secure mechanical coupling of the grip-controller assembly 9.

This embodiment can be further extended by further comprising a stabilizer handle 15 coupled to an outside lateral surface of the control-housing sheath 4, wherein the stabilizer handle 15 is disposed on the side of the control-housing sheath 4 to allow a user to hold the stabilizer handle 15 with the opposite hand of that which is used to grip the grip-controller assembly 9

This embodiment can be further extended wherein the stabilizer handle 15 can be readily coupled to either the right or left side of said control-housing sheath 4, as a user requires.

This embodiment can be further extended wherein the stabilizer handle 15 includes a grip at the distal end relative to the control-housing sheath 4 such that a user's free hand can grip the stabilizer handle 15 in a manner that puts that hand substantially orthogonal in orientation as compared to the hand gripping the grip-controller assembly 9 within the control-housing sheath 4.

This embodiment can be further extended wherein the sheath-to-user-arm-securing device 13 comprises a set of securing straps secured that can be tightened by a user by a means selected from the group consisting of a hook-and-loop mating configuration, a buckle-and-strap configuration, and a ratchet strap with a quick-release device.

This embodiment can be further extended wherein the electric power supply is a rechargeable battery that is coupled with the power-tool motor 1.

This embodiment can be further extended wherein the control-housing sheath 4 further comprises internal padding 14 for user comfort and to ensure a snug and stable fit on a user's hand and wrist.

This embodiment can be further extended wherein the control-housing sheath 4 further comprises at least one power-tool-work-area illumination lamp 18 disposed at the operating end 11 of the control-housing sheath 4 and/or on the power-tool motor 1.

This embodiment can be further extended wherein the at least one power-tool-work-area illumination lamp 18 is automatically energized whenever the power tool is energized.

This embodiment can be further extended wherein the at least one power-tool-work-area illumination lamp 18 is energized only when a user manually operates a control switch disposed on the control-housing sheath 4 that causes electrical current to flow through the lamp 18.

This embodiment can be further extended wherein the control-housing sheath 4 further comprises at least one holder for at least one power-tool accessory.

This embodiment can be further extended wherein the holder for at least one power-tool accessory holds at least one power-tool accessory selected from the group consisting of a drill bit, screw-driver bit, saw blade, and socket-head bit.

This embodiment can be further extended wherein the hand-held power tool is a power drill, a power screwdriver, a power reciprocating saw, a power wrench, or one of many other power tools.

Third Embodiment

A Method of Making an Ergonomic Hand-Held Power Tool

Referring to FIGS. 1-14, this embodiment encompasses a method of making an ergonomically enhanced hand-held power tool, comprising the steps of: providing a substantially rigid control-housing sheath 4 defining an inner volume to house user controls 6 and having an outer surface for the mounting of said power-tool motor 1, wherein the control-housing sheath 4 has a closed upper region and has a lower region, wherein the closed upper region of the control-housing sheath 4 defines the top of the control-housing sheath 4 and the lower region of the control-housing sheath 4 defines the bottom of the control-housing sheath 4, and wherein the control-housing sheath 4 is adapted to receive a user's hand and wrist in the inner volume; providing a grip-controller assembly 9 mechanically coupled to the control-housing sheath 4 within the inner volume for a user's hand to grip, wherein the grip-controller assembly 9 is adapted to be electrically coupled with the power-tool motor 1 and contains portions of the control circuitry 19 to facilitate user control over the power-tool energizing operations, and wherein the grip-controller assembly 9 is oriented such that when a user's hand is engaged with the grip-controller assembly 9, the top of a user's gripping hand is oriented toward said top of the control-housing sheath 4, providing a device 8, 10 adapted to mechanically and electrically receive and couple to the power-tool motor 1, which is adapted to mate with the mechanical and electrical coupling device 8, 10, wherein the device 8, 10 adapted to mechanically and electrically receive and couple to a power-tool motor 1 is disposed at the top of the control-housing sheath 4; and providing a sheath-to-user-arm-securing device 13 that adapts the control-housing sheath 4 to be able to substantially secure the wrist and/or lower forearm of a user to the control end 12 of the coupled power-tool motor 1 of the control-housing sheath 4, wherein when a user's hand and wrist are engaged with the control-housing sheath 4, including the grip-controller assembly 9, the axis of the user's hand and wrist is on a different, yet substantially parallel axis as that of said mounted power-tool motor 1 with the user's engaged hand and wrist substantially located directly below the coupled power-tool motor 1; whereby a user can exert directional force of the power tool using the control-housing sheath 4 and the grip-controller assembly 9.

This embodiment can be further extended wherein the mechanical and electrical coupling 8, 10 of the power-tool motor 1 on the control-housing sheath 4 employs a detachable and re-attachable coupling device 8, 10 to facilitate convenient user selection and use of power-tool motors 1 of different power ratings and/or types.

This embodiment can be further extended wherein the mechanical coupling 8 of the power-tool motor 1 on the control-housing sheath 4 employs at least one fastener of a type selected from the list consisting of continuous and discrete.

This embodiment can be further extended by further comprising the step of providing controls 6 on the grip-controller assembly 9 in order to allow a user's gripping hand to control power-tool energization.

This embodiment can be further extended wherein the mechanical coupling of the grip-controller assembly 9 is readily detachable, re-attachable, and reversible in position such that the grip-controller assembly 9 can be used by either a right-handed or left-handed user, and wherein the electric coupling of the grip-controller assembly 9 remains enabled even when the physical position has been reversed to accommodate either a right-handed user or a left-handed user.

This embodiment can be further extended wherein the grip-controller assembly 9 mechanical coupling employs at least one fastener of a type selected from the list consisting of continuous and discrete.

This embodiment can be further extended wherein the grip-controller assembly 9 mechanical coupling further comprises at least one spring-loaded, interlocking latch on each end of the grip-controller assembly 9, and wherein each interlocking latch is adapted to mate with an associated receiver slot within the lateral internal sides of the control-housing sheath 4 in order to facilitate a secure mechanical coupling of the grip-controller assembly 9

This embodiment can be further extended by further comprising the step of providing a stabilizer handle 15 coupled to an outside lateral surface of the control-housing sheath 4, wherein the stabilizer handle 15 is disposed on the side of the control-housing sheath 4 to allow a user to hold the stabilizer handle 15 with the opposite hand of that which is used to grip the grip-controller assembly 9.

This embodiment can be further extended wherein the stabilizer handle 15 can be readily coupled to either the right or left side of the control-housing sheath 4, as a user requires.

This embodiment can be further extended wherein the stabilizer handle 15 includes a grip at the distal end relative to the control-housing sheath 4 such that a user's free hand can grip the stabilizer handle 15 in a manner that puts that hand substantially orthogonal in orientation as compared to the hand gripping the grip-controller assembly 9 within the control-housing sheath 4.

This embodiment can be further extended wherein the sheath-to-user-arm-securing device 13 comprises a set of securing straps secured that can be tightened by a user by a means selected from the group consisting of a hook-and-loop mating configuration, a buckle-and-strap configuration, and a ratchet strap with a quick-release device.

This embodiment can be further extended wherein the electric power supply 2 is a rechargeable battery that is coupled with the power-tool motor 1.

This embodiment can be further extended by further comprising the step of providing internal padding 14 in the control-housing sheath 4 for user comfort and to ensure a snug and stable fit on a user's hand and wrist.

This embodiment can be further extended by further comprising the step of providing at least one power-tool-work-area illumination lamp 18 disposed at the operating end 11 of the control-housing sheath 4 and/or on the power-tool motor 1.

This embodiment can be further extended wherein said at least one power-tool-work-area illumination lamp 18 is automatically energized whenever the power tool is energized.

This embodiment can be further extended wherein the at least one power-tool-work-area illumination lamp 18 is energized only when a user manually operates a control switch disposed on the control-housing sheath that causes electrical current to flow through the lamp 18.

This embodiment can be further extended by further comprising the step of providing at least one holder 17 for at least one power-tool accessory disposed on the outside of the control-housing sheath 4.

This embodiment can be further extended by further comprising the step of providing for the holder 17 for at least one power-tool accessory at least one power-tool accessory selected from the group consisting of a drill bit, screw-driver bit, saw blade, and socket-head bit.

This embodiment can be further extended wherein the hand-held power tool is a power drill, a power screwdriver, a power reciprocating saw, a power wrench, or one of many other power tools.

Fourth Embodiment

A Method of Using an Ergonomic Hand-Held Power Tool

Referring to FIGS. 1-14, this embodiment encompasses a method of using an ergonomically enhanced hand-held power tool according to the First or Second Embodiment, comprising the steps of: inserting a user's hand into the control-housing sheath 4; securing the user's wrist/lower forearm, which is attached to said inserted user hand, to the proximal end of the control-housing sheath 4 with the sheath-to-user-arm-securing device 13; gripping the grip-controller assembly 9 in the control-housing sheath 4; operating the control circuitry 6, 19 in the grip-controller assembly 9 to energize the power-tool motor 1; and applying the operating power tool to a user-selected point with force from the user's arm.

This embodiment can be further extended wherein the mechanical and electrical coupling 8, 10 of the power-tool motor 1 on the control-housing sheath 4 employs a detachable and re-attachable coupling device 8, 10 to facilitate convenient user selection and use of power-tool motors 1 of different power ratings and/or types, the method further comprising the step of: before the step of inserting the user's hand into the control-housing sheath 4, selecting and attaching a power-tool motor 1 to said top of the control-housing sheath 4.

This embodiment can be further extended wherein the mechanical coupling 8 of the power-tool motor 1 on the control-housing sheath 4 employs at least one fastener of a type selected from the list consisting of continuous and discrete.

This embodiment can be further extended wherein the grip-controller assembly 9 has controls 6 on the grip-controller assembly 9 in order to allow a user's gripping hand to control power-tool energization, and wherein the method further comprises the steps of: before the step of energizing the power-tool motor 1, and if the power tool is equipped to operate in multiple rotational directions, operating the control circuitry 6 to select the direction of operation for the power tool, and after the step of energizing the power-tool motor 1, and if the power tool is equipped to be operated at different speeds, adjusting power-tool speed to user-desired level.

This embodiment can be further extended wherein the coupling of the grip-controller assembly 9 is readily detachable, re-attachable, and reversible in position such that the grip-controller assembly 9 can be used by either a right-handed or left-handed user, and wherein the electric coupling of the grip-controller assembly 9 remains enabled even when the physical position has been reversed to accommodate either a right-handed user or a left-handed user; and wherein the method further comprises the steps of: before the step of inserting the user's hand into the control-housing sheath 4, determining whether the control-housing sheath 4 needs to be oriented for a left-handed or right-handed user; and as necessary, decoupling and removing the grip-controller assembly 9, then reinstalling the grip-controller assembly 9 in the desired orientation within the control-housing sheath 4.

This embodiment can be further extended wherein the grip-controller assembly 9 mechanical coupling employs at least one fastener of a type selected from the list consisting of continuous and discrete.

This embodiment can be further extended wherein the grip-controller assembly 9 mechanical coupling further comprises at least one spring-loaded, interlocking latch on each end of the grip-controller assembly 9, wherein each interlocking latch is adapted to mate with an associated receiver slot within said lateral internal sides of the control-housing sheath 9 in order to facilitate a secure mechanical coupling of the grip-controller assembly 9.

This embodiment can be further extended wherein the control-housing sheath 4 further comprises a stabilizer handle 15 coupled to an outside lateral surface of the control-housing sheath 4, and wherein the stabilizer handle 15 is disposed on the side of the control-housing sheath 4 to allow a user to hold the stabilizer handle 15 with the opposite hand of that which is used to grip the grip-controller assembly 9; and wherein the method further comprises the step of gripping said stabilizer handle 15 with the user's hand not already gripping the grip-controller assembly 9.

This embodiment can be further extended wherein the stabilizer handle 15 can be readily coupled to either the right or left side of the control-housing sheath 4, as a user requires, and wherein the method further comprises the steps of: before the step of inserting the user's hand into the control-housing sheath 4, determining whether the stabilizer handle 15 needs to be oriented for a left-handed or right-handed user; and as necessary, decoupling and removing the stabilizer handle 15, then reinstalling the stabilizer handle 15 in the desired orientation on the control-housing sheath 4

This embodiment can be further extended wherein the stabilizer handle 15 includes a grip at the distal end relative to the control-housing sheath 4 such that the user's free hand can grip the stabilizer handle 15 in a manner that puts that hand substantially orthogonal in orientation as compared to the hand gripping the grip-controller assembly 9 within the control-housing sheath 4.

This embodiment can be further extended wherein the sheath-to-user-aim-securing device 13 comprises a set of securing straps secured and tightened by said user by a means selected from the group consisting of a hook-and-mat mating configuration, a buckle-and-strap configuration, and a ratchet strap with a quick-release device.

This embodiment can be further extended wherein the electric power supply 2 is a rechargeable battery that is coupled with the power-tool motor 1, and wherein the method further comprises the steps of: before the step of inserting the user's hand into the control-housing sheath 4, determining whether the rechargeable battery 2 is sufficiently charged; and as necessary, either removing, recharging, and reinstalling the rechargeable battery 2, or replacing the rechargeable battery 2 with a second sufficiently charged rechargeable battery 2.

This embodiment can be further extended wherein the control-housing sheath 4 further comprises internal padding 14 for user comfort and to ensure a snug and stable fit on the user's hand and wrist.

This embodiment can be further extended wherein the control-housing sheath 4 further comprises a power-tool-work-area illumination lamp array 18 disposed at the operating end 11 of the control-housing sheath 4 and/or on the power-tool motor 1.

This embodiment can be further extended wherein the power-tool-work-area illumination lamp array 18 is automatically energized whenever said power tool is energized.

This embodiment can be further extended wherein the power-tool-work-area illumination lamp array 18 is energized only when the user manually operates a control switch disposed on the control-housing sheath 18 that causes electrical current to flow through the lamp array 18, and wherein the method further comprises the step of: as necessary, turning on the power-tool-work-area lamp array 18.

This embodiment can be further extended wherein the control-housing sheath 4 further comprises at least one holder 17 for at least one power-tool accessory, and wherein the holder acts as a convenient receiver for at least one spare power-tool accessory selected from the group consisting of a drill bit, screw-driver bit, saw blade, and socket-head bit; and wherein the method further comprises the steps of: storing at least one spare power-tool accessory in the at least one holder 17; and as necessary, replacing using the at least one power-tool accessory with the power tool.

This embodiment can be further extended wherein the hand-held power tool is a power drill, a power screwdriver, a power reciprocating saw, a power wrench, or one of many other power tools.

Fifth Embodiment

An Ergonomic Hand-Held Receiver-Controller for a Power Tool

This embodiment is directed generally to an ergonomic hand-held receiver-controller for a power tool, such as an electric power drill, power wrench, power hammer drill, power screwdriver, reciprocating saw, etc.

Refer to FIGS. 1-14. The ergonomically enhanced receiver-controller for a power tool, which has a source of electric power, comprises: a substantially rigid control-housing sheath 4 defining an inner volume to house user controls and having an outer surface for the mounting of said power-tool, wherein the control-housing sheath 4 has a closed upper region and has a lower region, wherein the closed upper region of the control-housing sheath 4 defines the top of the control-housing sheath 4 and the lower region of the control-housing sheath 4 defines the bottom of the control-housing sheath 4, and wherein the control-housing sheath 4 is adapted to receive a user's hand and wrist in said inner volume; a grip-controller assembly 9 mechanically coupled to the control-housing sheath 4 within the inner volume for a user's hand to grip, wherein the grip-controller assembly 9 is adapted to be electrically coupled with a power-tool motor 1 and contains portions of the control circuitry 19 to facilitate user control over the power-tool energizing operations, and wherein the grip-controller assembly 9 is oriented such that when a user's hand is engaged with the grip-controller assembly 9, the top of a user's gripping hand is oriented toward said top of the control-housing sheath 4, a device 8, 10 adapted to mechanically and electrically receive and couple to a power-tool motor 1 adapted to mate with the mechanical and electrical coupling device 8, 10, wherein the device 8, 10 that is adapted to mechanically and electrically receive and couple to a power-tool motor 1 is disposed at the top of the control-housing sheath 4; and a sheath-to-user-arm-securing device 13 that adapts the control-housing sheath 4 to be able to substantially secure the wrist and/or lower forearm of a user to the control end 12 of the control-housing sheath 4, wherein when a user's hand and wrist are engaged with the control-housing sheath 4, including the grip-controller assembly 9, the axis of the user's hand and wrist is on a different, yet substantially parallel axis as that of said mounted power-tool motor 1; whereby a user can exert directional force of the power tool using the control-housing sheath 4 and the grip-controller assembly 9.

This embodiment can be further extended wherein the mechanical and electrical coupling 8, 10 for receiving a power-tool motor 1 on the control-housing sheath 9 employs a detachable and re-attachable coupling device 8, 10 to facilitate convenient user selection and use of power-tool motors of different power ratings and/or types.

This embodiment can be further extended wherein the mechanical coupling 8 for receiving a power-tool motor 1 on the control-housing sheath 4 employs at least one fastener of a type selected from the list consisting of continuous and discrete.

This embodiment can be further extended wherein the mechanical coupling of the grip-controller assembly 9 is readily detachable, re-attachable, and reversible in position such that the grip-controller assembly 9 can be used by either a right-handed or left-handed user, and wherein the electric coupling of the grip-controller assembly 9 remains enabled even when the physical position has been reversed to accommodate either a right-handed user or a left-handed user.

This embodiment can be further extended wherein the grip-controller assembly 9 mechanical coupling employs at least one fastener of a type selected from the list consisting of continuous and discrete.

This embodiment can be further extended wherein the grip-controller assembly 9 mechanical coupling further comprises at least one spring-loaded, interlocking latch on each end of said grip-controller assembly, and wherein each interlocking latch is adapted to mate with an associated receiver slot within said lateral internal sides of the control-housing sheath 4 in order to facilitate a secure mechanical coupling of the grip-controller assembly 9.

This embodiment can be further extended wherein the hand-held receiver-controller further comprises a stabilizer handle 15 coupled to an outside lateral surface of the control-housing sheath 4, wherein the stabilizer handle 4 is disposed on the side of the control-housing sheath 9 to allow a user to hold the stabilizer handle 15 with the opposite hand of that which is used to grip the grip-controller assembly 9.

This embodiment can be further extended wherein the stabilizer handle 15 can be readily coupled to either the right or left side of the control-housing sheath 4, as a user requires.

This embodiment can be further extended wherein the stabilizer handle 15 includes a grip at the distal end relative to the control-housing sheath 4 such that a user's free hand can grip the stabilizer handle b15 in a manner that puts that hand substantially orthogonal in orientation as compared to the hand gripping the grip-controller assembly 9 within the control-housing sheath 4.

This embodiment can be further extended wherein the sheath-to-user-arm-securing device 13 comprises a set of securing straps secured that can be tightened by a user by a means selected from the group consisting of a hook-and-loop mating configuration, a buckle-and-strap configuration, and a ratchet strap with a quick-release device.

This embodiment can be further extended wherein the control-housing sheath 4 further comprises internal padding 14 for user comfort and to ensure a snug and stable fit on a user's hand and wrist.

This embodiment can be further extended wherein the control-housing sheath 4 further comprises at least one power-tool-work-area illumination lamp 18 disposed at the operating end 11 of the control-housing sheath 4.

This embodiment can be further extended wherein the at least one power-tool-work area illumination lamp 18 is automatically energized whenever a coupled power tool is energized.

This embodiment can be further extended wherein said at least one power-tool-work-area illumination lamp 18 is energized only when said user manually operates a control switch disposed on the control-housing sheath 4 that causes electrical current to flow through the at least one power-tool-work-area illumination lamp 18.

Sixth Embodiment

A Method for Making an Ergonomic Hand-Held Receiver-Controller for a Power Tool

Referring to FIGS. 1-14, this embodiment encompasses a method of making an ergonomically enhanced hand-held receiver-controller for a power too, which has a source of electric power, comprising the steps of: providing a substantially rigid control-housing sheath 4 defining an inner volume to house user controls and having an outer surface for the mounting of the power-tool, wherein the control-housing sheath 4 has a closed upper region and has a lower region, wherein the closed upper region of the control-housing sheath 4 defines the top of the control-housing sheath 4 and the lower region of the control-housing sheath 4 defines the bottom of the control-housing sheath 4, and wherein the control-housing sheath 4 is adapted to receive a user's hand and wrist in said inner volume; providing a grip-controller assembly 9 mechanically coupled to the control-housing sheath 4 within the inner volume for a user's hand to grip, wherein the grip-controller assembly 9 is adapted to be electrically coupled with a power-tool motor 1 and contains portions of the control circuitry 19 to facilitate user control over the power-tool energizing operations, and wherein the grip-controller assembly 9 is oriented such that when a user's hand is engaged with the grip-controller assembly 9, the top of a user's gripping hand is oriented toward said top of the control-housing sheath 4, providing a device 8, 10 adapted to mechanically and electrically receive and couple to a power-tool motor 1 adapted to mate with said mechanical and electrical coupling device 8, 10, wherein the device 8, 10 that is adapted to mechanically and electrically receive and couple to a power-tool motor is disposed at the top of the control-housing sheath 4; and providing a sheath-to-user-arm-securing device 13 that adapts the control-housing sheath 4 to be able to substantially secure the wrist and/or lower forearm of a user to the control end 12 of the control-housing sheath 4, wherein when a user's hand and wrist are engaged with the control-housing sheath 4, including the grip-controller assembly 9, the axis of the user's hand and wrist is on a different, yet substantially parallel axis as that of a mounted power-tool motor 1; whereby a user can exert directional force of a coupled power tool using the control-housing sheath 4 with the grip-controller assembly 9.

This embodiment can be further extended wherein the mechanical and electrical coupling 8, 10 for receiving a power-tool motor 1 on the control-housing sheath employs a detachable and re-attachable coupling device 8, 10 to facilitate convenient user selection and use of power-tool motors of different power ratings and/or types.

This embodiment can be further extended wherein the mechanical coupling 8 for receiving a power-tool motor 1 on the control-housing sheath 4 employs at least one fastener of a type selected from the list consisting of continuous and discrete.

This embodiment can be further extended wherein the mechanical coupling of the grip-controller assembly 9 is readily detachable, re-attachable, and reversible in position such that the grip-controller assembly 9 can be used by either a right-handed or left-handed user, and wherein the electric coupling of the grip-controller assembly 9 remains enabled even when the physical position has been reversed to accommodate either a right-handed user or a left-handed user.

This embodiment can be further extended wherein the grip-controller assembly 9 mechanical coupling employs at least one fastener of a type selected from the list consisting of continuous and discrete.

This embodiment can be further extended wherein the grip-controller assembly 9 mechanical coupling further comprises at least one spring-loaded, interlocking latch on each end of said grip-controller assembly, and wherein each interlocking latch is adapted to mate with an associated receiver slot within the lateral internal sides of the control-housing sheath 4 in order to facilitate a secure mechanical coupling of the grip-controller assembly 9.

This embodiment can be further extended by further comprising the step of providing a stabilizer handle 15 coupled to an outside lateral surface of the control-housing sheath 4, wherein the stabilizer handle 15 is disposed on the side of the control-housing sheath 4 to allow a user to hold the stabilizer handle 15 with the opposite hand of that which is used to grip said grip-controller assembly 9.

This embodiment can be further extended wherein the stabilizer handle 15 can be readily coupled to either the right or left side of the control-housing sheath 4, as a user requires.

This embodiment can be further extended wherein the stabilizer handle 15 includes a grip at the distal end relative to the control-housing sheath 4 such that a user's free hand can grip the stabilizer handle 15 in a manner that puts that hand substantially orthogonal in orientation as compared to the hand gripping the grip-controller assembly 9 within the control-housing sheath 4.

This embodiment can be further extended wherein the sheath-to-user-arm-securing device 13 comprises a set of securing straps secured that can be tightened by a user by a means selected from the group consisting of a hook-and-loop mating configuration, a buckle-and-strap configuration, and a ratchet strap with a quick-release device.

This embodiment can be further extended by further comprising the step of providing internal padding 14 in the control-housing sheath 4 for user comfort and to ensure a snug and stable fit on a user's hand and wrist.

This embodiment can be further extended by further comprising the step of providing at least one power-tool-work-area illumination lamp 18 disposed at the operating end 11 of the control-housing sheath 4.

This embodiment can be further extended wherein the at least one power-tool-work-area illumination lamp 18 is automatically energized whenever a coupled power tool is energized.

This embodiment can be further extended wherein the at least one power-tool-work-area illumination lamp 18 is energized only when said user manually operates a control switch disposed on the control-housing sheath 4 that causes electrical current to flow through said at least one power-tool-work-area illumination lamp 18.

Alternative Embodiments and Other Variations

The various embodiments and variations thereof described herein and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

For instance, the present inventive disclosure is directed generally to an ergonomic hand-held power tool, such as an electric power drill, power wrench, power hammer drill, power screwdriver, etc. However, to aid in clarity and efficiency in communication, the various embodiments discussed and illustrated herein focus on an electric power drill for exemplary purposes only. These exemplary embodiments are easily contemplated as being adaptable for use with other types of common power tools, including those powered by electricity, pneumatics, or hydraulics.

Hence, those ordinarily skilled in the art will have no difficulty devising myriad obvious variations and improvements to the invention, all of which are intended to be encompassed within the scope of the claims which follow.

What is claimed is:

1. An ergonomic hand-held power tool; said power tool being electrically powered; said power tool having an electric motor; said power tool having an electric power supply; said power tool having control circuitry to control power tool operations, including energizing and de-energizing said power tool; said power tool comprising:

a substantially rigid control-housing sheath defining an inner volume to house user controls and having an outer surface for the mounting of said power-tool motor, wherein said control-housing sheath has a closed upper region and has a lower region,
wherein said closed upper region of said control-housing sheath defines the top of said control-housing sheath and said lower region of said control-housing sheath defines the bottom of said control-housing sheath, and wherein said control-housing sheath is adapted to receive a user's hand and wrist in said inner volume;

a grip-controller assembly mechanically coupled to said control-housing sheath within said inner volume for a user's hand to grip, wherein said grip-controller assembly is adapted to be electrically coupled with said power-tool motor and contains portions of said control circuitry to facilitate user control over said power-tool energizing operations, and wherein said grip-controller assembly is oriented such that when a user's hand is engaged with said grip-controller assembly, the top of a user's gripping hand is oriented toward said top of said control-housing sheath, a device adapted to mechanically and electrically receive and couple to said power-tool motor, which is adapted to mate with said mechanical and electrical coupling device, wherein said device that is adapted to mechanically and electrically receive and couple to a power-tool motor is disposed at the top of said control-housing sheath; and a sheath-to-user-arm-securing device that adapts said control-housing sheath to be able to substantially secure the wrist and/or lower forearm of a user to the control end of said control-housing sheath, wherein when a user's hand and wrist are engaged with said control-housing sheath, including said grip-controller assembly, the axis of the user's hand and wrist is on a different, yet substantially parallel axis as that of said mounted power-tool motor with the user's engaged hand and wrist substantially located directly below said coupled power-tool motor;

whereby a user can exert directional force of said power tool using said control-housing sheath with said grip-controller assembly.

2. The hand-held power tool of claim 1, wherein said mechanical and electrical coupling of said power-tool motor on said control-housing sheath employs a detachable and re-attachable coupling device to facilitate convenient user selection and use of power-tool motors of different power ratings and/or types.

3. The hand-held power tool of claim 1, wherein said mechanical coupling of said power-tool motor on said control-housing sheath employs at least one fastener of a type selected from the list consisting of continuous and discrete.

4. The hand-held power tool of claim 1, wherein said grip-controller assembly has controls to allow a user's gripping hand to control power-tool energization.

5. The hand-held power tool of claim 1, wherein:

said mechanical coupling of said grip-controller assembly is readily detachable, re-attachable, and reversible in position such that said grip-controller assembly can be used by either a right-handed or left-handed user, and said electric coupling of said grip-controller assembly remains enabled even when the physical position has been reversed to accommodate either a right-handed user or a left-handed user.

6. The hand-held power tool of claim 5, wherein said grip-controller assembly mechanical coupling employs at least one fastener of a type selected from the list consisting of continuous and discrete.

7. The hand-held power tool of claim 5, wherein said grip-controller assembly mechanical coupling further comprises at least one spring-loaded, interlocking latch on each end of said grip-controller assembly, wherein each said interlocking latch is adapted to mate with an associated receiver slot within said lateral internal sides of said control-housing sheath in order to facilitate a secure mechanical coupling of said grip-controller assembly.

8. The hand-held power tool of claim 1, further comprising a stabilizer handle coupled to an outside lateral surface of said control-housing sheath, wherein said stabilizer handle is disposed on the side of said control-housing sheath to allow a user to hold said stabilizer handle with the opposite hand of that which is used to grip said grip-controller assembly.

9. The hand-held power tool of claim 8, wherein said stabilizer handle can be readily coupled to either the right or left side of said control-housing sheath, as a user requires.

10. The hand-held power tool of claim 8, wherein said stabilizer handle includes a grip at the distal end relative to said control-housing sheath such that a user's free hand can grip said stabilizer handle in a manner that puts that hand substantially orthogonal in orientation as compared to the hand gripping said grip-controller assembly within said control-housing sheath.

11. The hand-held power tool of claim 1, wherein said sheath-to-user-arm-securing device comprises a set of securing straps secured that can be tightened by a user by a means selected from the group consisting of a hook-and-loop mating configuration, a buckle-and-strap configuration, and a ratchet strap with a quick-release device.

12. The hand-held power tool of claim 1, wherein said electric power supply is a rechargeable battery that is coupled with said power-tool motor.

13. The hand-held power tool of claim 1, wherein said control-housing sheath further comprises internal padding for user comfort and to ensure a snug and stable fit on a user's hand and wrist.

14. The hand-held power tool of claim 1, wherein said control-housing sheath further comprises at least one power-tool-work-area illumination lamp disposed at said operating end of said control-housing sheath and/or on said power-tool motor.

15. The hand-held power tool of claim 14, wherein said at least one power-tool-work-area illumination lamp is automatically energized whenever said power tool is energized.

16. The hand-held power tool of claim 14, wherein said at least one power-tool-work-area illumination lamp is energized only when a user manually operates a control switch disposed on said control-housing sheath that causes electrical current to flow through said lamp.

17. The hand-held power tool of claim 1, wherein said control-housing sheath further comprises at least one holder for at least one power-tool accessory.

18. The hand-held power tool of claim 17, wherein said holder for at least one power-tool accessory holds at least one power-tool accessory selected from the group consisting of a drill bit, screw-driver bit, saw blade, and socket-head bit.

19. The hand-held power tool of claim 1, wherein said hand-held power tool is a power drill.

20. The hand-held power tool of claim 1, wherein said hand-held power tool is a power screwdriver.

21. The hand-held power tool of claim 1, wherein said hand-held power tool is a power reciprocating saw.

22. The hand-held power tool of claim 1, wherein said hand-held power tool is a power wrench.

23. A method of making an ergonomic hand-held power tool; said power tool being electrically powered; said power tool having an electric motor; said power tool having an electric power supply; said power tool having control circuitry to control power tool operations, including energizing and de-energizing said power tool; the method comprising the steps of:

providing a substantially rigid control-housing sheath defining an inner volume to house user controls and having an outer surface for the mounting of said power-tool motor,
wherein said control-housing sheath has a closed upper region and has a lower region,
wherein said closed upper region of said control-housing sheath defines the top of said control-housing sheath and said lower region of said control-housing sheath defines the bottom of said control-housing sheath, and
wherein said control-housing sheath is adapted to receive a user's hand and wrist in said inner volume;

providing a grip-controller assembly mechanically coupled to said control-housing sheath within said inner volume for a user's hand to grip,
wherein said grip-controller assembly is adapted to be electrically coupled with said power-tool motor and contains portions of said control circuitry to facilitate user control over said power-tool energizing operations, and
wherein said grip-controller assembly is oriented such that when a user's hand is engaged with said grip-controller assembly, the top of a user's gripping hand is oriented toward said top of said control-housing sheath, providing a device adapted to mechanically and electrically receive and couple to said power-tool motor, which is adapted to mate with said mechanical and electrical coupling device,
wherein said device that is adapted to mechanically and electrically receive and couple to a power-tool motor is disposed at the top of said control-housing sheath; and providing a sheath-to-user-arm-securing device that adapts said control-housing sheath to be able to substantially secure the wrist and/or lower forearm of a user to the control end of said control-housing sheath,
wherein when a user's hand and wrist are engaged with said control-housing sheath, including said grip-controller assembly, the axis of the user's hand and wrist is on a different, yet substantially parallel axis as that of said mounted power-tool motor with the user's engaged hand and wrist substantially located directly below said coupled power-tool motor;

whereby a user can exert directional force of said power tool using said control-housing sheath with said grip-controller assembly.

24. The method of claim 23, wherein said mechanical and electrical coupling of said power-tool motor on said control-housing sheath employs a detachable and re-attachable coupling device to facilitate convenient user selection and use of power-tool motors of different power ratings and/or types.

25. The method of claim 23, wherein said mechanical coupling of said power-tool motor on said control-housing sheath employs at least one fastener of a type selected from the list consisting of continuous and discrete.

26. The method of claim 23, further comprising the step of providing controls on said grip-controller assembly in order to allow a user's gripping hand to control power-tool energization.

27. The method of claim 23, wherein:
said mechanical coupling of said grip-controller assembly is readily detachable, re-attachable, and reversible in position such that said grip-controller assembly can be used by either a right-handed or left-handed user, and
said electric coupling of said grip-controller assembly remains enabled even when the physical position has been reversed to accommodate either a right-handed user or a left-handed user.

28. The method of claim 27, wherein said grip-controller assembly mechanical coupling employs at least one fastener of a type selected from the list consisting of continuous and discrete.

29. The method of claim 27, wherein said grip-controller assembly mechanical coupling further comprises at least one spring-loaded, interlocking latch on each end of said grip-controller assembly,
wherein each said interlocking latch is adapted to mate with an associated receiver slot within said lateral internal sides of said control-housing sheath in order to facilitate a secure mechanical coupling of said grip-controller assembly.

30. The method of claim 23, further comprising the step of providing a stabilizer handle coupled to an outside lateral surface of said control-housing sheath,
wherein said stabilizer handle is disposed on the side of said control-housing sheath to allow a user to hold said stabilizer handle with the opposite hand of that which is used to grip said grip-controller assembly.

31. The method of claim 30, wherein said stabilizer handle can be readily coupled to either the right or left side of said control-housing sheath, as a user requires.

32. The method of claim 30, wherein said stabilizer handle includes a grip at the distal end relative to said control-housing sheath such that a user's free hand can grip said stabilizer handle in a manner that puts that hand substantially orthogonal in orientation as compared to the hand gripping said grip-controller assembly within said control-housing sheath.

33. The method of claim 23, wherein said sheath-to-user-arm-securing device comprises a set of securing straps secured that can be tightened by a user by a means selected from the group consisting of a hook-and-loop mating configuration, a buckle-and-strap configuration, and a ratchet strap with a quick-release device.

34. The method of claim 23, wherein said electric power supply is a rechargeable battery that is coupled with said power-tool motor.

35. The method of claim 23, further comprising the step of providing internal padding in said control-housing sheath for user comfort and to ensure a snug and stable fit on a user's hand and wrist.

36. The method of claim 23, further comprising the step of providing at least one power-tool-work-area illumination lamp disposed at said operating end of said control-housing sheath and/or on said power-tool motor.

37. The method of claim 36, wherein said at least one power-tool-work-area illumination lamp is automatically energized whenever said power tool is energized.

38. The method of claim 36, wherein said at least one power-tool-work-area illumination lamp is energized only when a user manually operates a control switch disposed on said control-housing sheath that causes electrical current to flow through said lamp.

39. The method of claim 23, further comprising the step of providing at least one holder for at least one power-tool accessory disposed on the outside of said control-housing sheath.

40. The method of claim 39, further comprising the step of providing for said holder for at least one power-tool accessory at least one power-tool accessory selected from the group consisting of a drill bit, screw-driver bit, saw blade, and socket-head bit.

41. The method of claim 23, wherein said hand-held power tool is a power drill.

42. The method of claim 23, wherein said hand-held power tool is a power screwdriver.

43. The method of claim 23, wherein said hand-held power tool is a power reciprocating saw.

44. The method of claim 23, wherein said hand-held power tool is a power wrench.

45. A method of using a hand-held power tool; said power tool being electrically powered; said power tool having an electric motor; said power tool having an electric power supply; said power tool having control circuitry to control power tool operations, including energizing and de-energizing said power tool; said power tool comprising:
a substantially rigid control-housing sheath defining an inner volume to house user controls and having an outer surface for the mounting of said power-tool motor,
wherein said control-housing sheath has a closed upper region and has a lower region,
wherein said closed upper region of said control-housing sheath defines the top of said control-housing sheath and said lower region of said control-housing sheath defines the bottom of said control-housing sheath, and
wherein said control-housing sheath is adapted to receive a user's hand and wrist in said inner volume;
a grip-controller assembly mechanically coupled to said control-housing sheath within said inner volume for a user's hand to grip,
wherein said grip-controller assembly is adapted to be electrically coupled with said power-tool motor and contains portions of said control circuitry to facilitate user control over said power-tool energizing operations, and
wherein said grip-controller assembly is oriented such that when a user's hand is engaged with said grip-controller assembly, the top of a user's gripping hand is oriented toward said top of said control-housing sheath,
a device adapted to mechanically and electrically receive and couple to said power-tool motor, which is adapted to mate with said mechanical and electrical coupling device,
wherein said device that is adapted to mechanically and electrically receive and couple to a power-tool motor is disposed at the top of said control-housing sheath; and
a sheath-to-user-arm-securing device that adapts said control-housing sheath to be able to substantially secure the wrist and/or lower forearm of a user to the control end of said control-housing sheath,
wherein when a user's hand and wrist are engaged with said control-housing sheath, including said grip-controller assembly, the axis of the user's hand and wrist is on a different, yet substantially parallel axis as that of said mounted power-tool motor with the user's engaged hand and wrist substantially located directly below said coupled power-tool motor;
whereby a user can exert directional force of said power tool using said control-housing sheath with said grip-controller assembly;
the method comprising the steps of:
inserting a user's hand into said control-housing sheath;
securing said user's wrist/lower forearm, which is attached to said inserted user hand, to the proximal end of said control-housing sheath with said sheath-to-user-arm-securing device;
gripping the grip-controller assembly in said control-housing sheath;
operating said control circuitry in said grip-controller assembly to energize said power-tool motor; and
applying the operating power tool to a user-selected point with force from said user's arm.

46. The method of claim 45, wherein said mechanical and electrical coupling of said power-tool motor on said control-housing sheath employs a detachable and re-attachable coupling device to facilitate convenient user selection and use of power-tool motors of different power ratings and/or types, the method further comprising the step of:
before the step of inserting the user's hand into said control-housing sheath, selecting and attaching a power-tool motor to said top of said control-housing sheath.

47. The method of claim 45, wherein said mechanical coupling of said power-tool motor on said control-housing sheath employs at least one fastener of a type selected from the list consisting of continuous and discrete.

48. The method of claim 45, wherein said grip-controller assembly has controls on said grip-controller assembly in order to allow a user's gripping hand to control power-tool energization, the method further comprising the steps of:
before the step of energizing said power-tool motor, and if said power tool is equipped to operate in multiple rotational directions, operating said control circuitry to select the direction of operation for said power tool, and
after the step of powering on said power-tool motor, and if said power tool is equipped to be operated at different speeds, adjusting power-tool speed to user-desired level.

49. The method of claim 45, wherein:
said coupling of said grip-controller assembly is readily detachable, re-attachable, and reversible in position such that said grip-controller assembly can be used by either a right-handed or left-handed user, and
said electric coupling of said grip-controller assembly remains enabled even when the physical position has been reversed to accommodate either a right-handed user or a left-handed user;
the method further comprising the steps of:
before the step of inserting the user's hand into said control-housing sheath, determining whether said control-housing sheath needs to be oriented for a left-handed or right-handed user; and
as necessary, decoupling and removing said grip-controller assembly, then reinstalling said grip-controller assembly in the desired orientation within said control-housing sheath.

50. The method of claim 49, wherein said grip-controller assembly mechanical coupling employs at least one fastener of a type selected from the list consisting of continuous and discrete.

51. The method of claim 49, wherein said grip-controller assembly mechanical coupling further comprises at least one spring-loaded, interlocking latch on each end of said grip-controller assembly,
wherein each said interlocking latch is adapted to mate with an associated receiver slot within said lateral internal sides of said control-housing sheath in order to facilitate a secure mechanical coupling of said grip-controller assembly.

52. The method of claim 45, wherein said control-housing sheath further comprises a stabilizer handle coupled to an outside lateral surface of said control-housing sheath, and
wherein said stabilizer handle is disposed on the side of said control-housing sheath to allow a user to hold said stabilizer handle with the opposite hand of that which is used to grip said grip-controller assembly;
the method further comprising the step of gripping said stabilizer handle with the user's hand not already gripping said grip-controller assembly.

53. The method of claim 52, wherein said stabilizer handle can be readily coupled to either the right or left side of said control-housing sheath, as a user requires, the method further comprising the steps of:
before the step of inserting the user's hand into said control-housing sheath, determining whether said stabilizer handle needs to be oriented for a left-handed or right-handed user; and
as necessary, decoupling and removing said stabilizer handle, then reinstalling said stabilizer handle in the desired orientation on said control-housing sheath.

54. The method of claim 52, wherein said stabilizer handle includes a grip at the distal end relative to said control-housing sheath such that the user's free hand can grip said stabilizer handle in a manner that puts that hand substantially orthogonal in orientation as compared to the hand gripping said grip-controller assembly within said control-housing sheath.

55. The method of claim 45, wherein said sheath-to-user-arm-securing device comprises a set of securing straps secured and tightened by said user by a means selected from the group consisting of a hook-and-mat mating configuration, a buckle-and-strap configuration, and a ratchet strap with a quick-release device.

56. The method of claim 45, wherein said electric power supply is a rechargeable battery that is coupled with said power-tool motor, the method further comprising the steps of:
before the step of inserting the user's hand into said control-housing sheath, determining whether said rechargeable battery is sufficiently charged; and
as necessary, either removing, recharging, and reinstalling said rechargeable battery, or replacing said rechargeable battery with a second sufficiently charged rechargeable battery.

57. The method of claim 45, wherein said control-housing sheath further comprises internal padding for user comfort and to ensure a snug and stable fit on the user's hand and wrist.

58. The method of claim 45, wherein said control-housing sheath further comprises a power-tool-work-area illumination lamp array disposed at said operating end of said control-housing sheath and/or on said power-tool motor.

59. The method of claim 58, wherein said power-tool-work-area illumination lamp array is automatically energized whenever said power tool is energized.

60. The method of claim 58, wherein said power-tool-work-area illumination lamp array is energized only when said user manually operates a control switch disposed on said control-housing sheath that causes electrical current to flow through said lamp array, the method further comprising the step of:
as necessary, turning on said power-tool-work-area lamp array.

61. The method of claim 45, wherein:
said control-housing sheath further comprises at least one holder for at least one power-tool accessory, and
said holder acts as a convenient receiver for at least one spare power-tool accessory selected from the group consisting of a drill bit, screw-driver bit, saw blade, and socket-head bit;
the method further comprising the steps of:
storing at least one spare power-tool accessory in said at least one holder; and
as necessary, replacing using said at least one power-tool accessory with said power tool.

62. The method of claim 45, wherein said hand-held power tool is a power drill.

63. The method of claim 45, wherein said hand-held power tool is a power screwdriver.

64. The method of claim 45, wherein said hand-held power tool is a power reciprocating saw.

65. The method of claim 45, wherein said hand-held power tool is a power wrench.

66. An ergonomic hand-held receiver-controller for a power tool, said power tool having electrical power; the hand-held receiver-controller comprising:
a substantially rigid control-housing sheath defining an inner volume to house user controls and having an outer surface for the mounting of said power-tool,
wherein said control-housing sheath has a closed upper region and has a lower region,
wherein said closed upper region of said control-housing sheath defines the top of said control-housing sheath and said lower region of said control-housing sheath defines the bottom of said control-housing sheath, and
wherein said control-housing sheath is adapted to receive a user's hand and wrist in said inner volume;
a grip-controller assembly mechanically coupled to said control-housing sheath within said inner volume for a user's hand to grip,
wherein said grip-controller assembly is adapted to be electrically coupled with a power-tool motor and contains portions of said control circuitry to facilitate user control over said power-tool energizing operations, and
wherein said grip-controller assembly is oriented such that when a user's hand is engaged with said grip-controller assembly, the top of a user's gripping hand is oriented toward said top of said control-housing sheath,
a device adapted to mechanically and electrically receive and couple to a power-tool motor adapted to mate with said mechanical and electrical coupling device,
wherein said device that is adapted to mechanically and electrically receive and couple to a power-tool motor is disposed at the top of said control-housing sheath; and
a sheath-to-user-arm-securing device that adapts said control-housing sheath to be able to substantially secure the wrist and/or lower forearm of a user to the control end of said control-housing sheath,
wherein when a user's hand and wrist are engaged with said control-housing sheath, including said grip-controller assembly, the axis of the user's hand and wrist is on a different, yet substantially parallel axis as that of a mounted power-tool motor;
whereby a user can exert directional force of a coupled power tool using said control-housing sheath with said grip-controller assembly.

67. The hand-held receiver-controller for a power tool of claim 66, wherein said mechanical and electrical coupling for receiving a power-tool motor on said control-housing sheath employs a detachable and re-attachable coupling device to facilitate convenient user selection and use of power-tool motors of different power ratings and/or types.

68. The hand-held receiver-controller for a power tool of claim 66, wherein said mechanical coupling for receiving a power-tool motor on said control-housing sheath employs at least one fastener of a type selected from the list consisting of continuous and discrete.

69. The hand-held receiver-controller for a power tool of claim 66, wherein:
said mechanical coupling of said grip-controller assembly is readily detachable, re-attachable, and reversible in position such that said grip-controller assembly can be used by either a right-handed or left-handed user, and
said electric coupling of said grip-controller assembly remains enabled even when the physical position has been reversed to accommodate either a right-handed user or a left-handed user.

70. The hand-held receiver-controller for a power tool of claim 69, wherein said grip-controller assembly mechanical coupling employs at least one fastener of a type selected from the list consisting of continuous and discrete.

71. The hand-held receiver-controller for a power tool of claim 69, wherein said grip-controller assembly mechanical coupling further comprises at least one spring-loaded, interlocking latch on each end of said grip-controller assembly,
wherein each said interlocking latch is adapted to mate with an associated receiver slot within said lateral internal sides of said control-housing sheath in order to facilitate a secure mechanical coupling of said grip-controller assembly.

72. The hand-held receiver-controller for a power tool of claim 66, further comprising a stabilizer handle coupled to an outside lateral surface of said control-housing sheath,
wherein said stabilizer handle is disposed on the side of said control-housing sheath to allow a user to hold said stabilizer handle with the opposite hand of that which is used to grip said grip-controller assembly.

73. The hand-held receiver-controller for a power tool of claim 72, wherein said stabilizer handle can be readily coupled to either the right or left side of said control-housing sheath, as a user requires.

74. The hand-held receiver-controller for a power tool of claim 72, wherein said stabilizer handle includes a grip at the distal end relative to said control-housing sheath such that a user's free hand can grip said stabilizer handle in a manner that puts that hand substantially orthogonal in orientation as compared to the hand gripping said grip-controller assembly within said control-housing sheath.

75. The hand-held receiver-controller for a power tool of claim 66, wherein said sheath-to-user-arm-securing device comprises a set of securing straps secured that can be tightened by a user by a means selected from the group consisting of a hook-and-loop mating configuration, a buckle-and-strap configuration, and a ratchet strap with a quick-release device.

76. The hand-held receiver-controller for a power tool of claim 66, wherein said control-housing sheath further comprises internal padding for user comfort and to ensure a snug and stable fit on a user's hand and wrist.

77. The hand-held receiver-controller for a power tool of claim 66, wherein said control-housing sheath further comprises at least one power-tool-work-area illumination lamp disposed at said operating end of said control-housing sheath.

78. The hand-held receiver-controller for a power tool of claim 77, wherein said at least one power-tool-work-area illumination lamp is automatically energized whenever a coupled power tool is energized.

79. The hand-held receiver-controller for a power tool of claim 77, wherein said at least one power-tool-work-area illumination lamp is energized only when said user manually operates a control switch disposed on said control-housing sheath that causes electrical current to flow through said at least one power-tool-work-area illumination lamp.

80. A method for making an ergonomic hand-held receiver-controller for a power tool; said power tool having electrical power; the method comprising the steps of:
providing a substantially rigid control-housing sheath defining an inner volume to house user controls and having an outer surface for the mounting of said power-tool,
wherein said control-housing sheath has a closed upper region and has a lower region,
wherein said closed upper region of said control-housing sheath defines the top of said control-housing sheath and said lower region of said control-housing sheath defines the bottom of said control-housing sheath, and
wherein said control-housing sheath is adapted to receive a user's hand and wrist in said inner volume;
providing a grip-controller assembly mechanically coupled to said control-housing sheath within said inner volume for a user's hand to grip,
wherein said grip-controller assembly is adapted to be electrically coupled with a power-tool motor and contains portions of said control circuitry to facilitate user control over said power-tool energizing operations, and
wherein said grip-controller assembly is oriented such that when a user's hand is engaged with said grip-controller assembly, the top of a user's gripping hand is oriented toward said top of said control-housing sheath,
providing a device adapted to mechanically and electrically receive and couple to a power-tool motor adapted to mate with said mechanical and electrical coupling device,
wherein said device that is adapted to mechanically and electrically receive and couple to a power-tool motor is disposed at the top of said control-housing sheath; and
providing a sheath-to-user-arm-securing device that adapts said control-housing sheath to be able to substantially secure the wrist and/or lower forearm of a user to the control end of said control-housing sheath,
wherein when a user's hand and wrist are engaged with said control-housing sheath, including said grip-controller assembly, the axis of the user's hand and wrist is on a different, yet substantially parallel axis as that of a mounted power-tool motor;
whereby a user can exert directional force of a coupled power tool using said control-housing sheath with said grip-controller assembly.

81. The method of claim 80, wherein said mechanical and electrical coupling for receiving a power-tool motor on said control-housing sheath employs a detachable and re-attachable coupling device to facilitate convenient user selection and use of power-tool motors of different power ratings and/or types.

82. The method of claim 80, wherein said mechanical coupling for receiving a power-tool motor on said control-housing sheath employs at least one fastener of a type selected from the list consisting of continuous and discrete.

83. The method of claim 80, wherein:
said mechanical coupling of said grip-controller assembly is readily detachable, re-attachable, and reversible in position such that said grip-controller assembly can be used by either a right-handed or left-handed user, and
said electric coupling of said grip-controller assembly remains enabled even when the physical position has been reversed to accommodate either a right-handed user or a left-handed user.

84. The method of claim 80, wherein said grip-controller assembly mechanical coupling employs at least one fastener of a type selected from the list consisting of continuous and discrete.

85. The method of claim 84, wherein said grip-controller assembly mechanical coupling further comprises at least one spring-loaded, interlocking latch on each end of said grip-controller assembly,
wherein each said interlocking latch is adapted to mate with an associated receiver slot within said lateral internal sides of said control-housing sheath in order to facilitate a secure mechanical coupling of said grip-controller assembly.

86. The method of claim 80, further comprising the step of providing a stabilizer handle coupled to an outside lateral surface of said control-housing sheath,
wherein said stabilizer handle is disposed on the side of said control-housing sheath to allow a user to hold said stabilizer handle with the opposite hand of that which is used to grip said grip-controller assembly.

87. The method of claim 86, wherein said stabilizer handle can be readily coupled to either the right or left side of said control-housing sheath, as a user requires.

88. The method of claim 86, wherein said stabilizer handle includes a grip at the distal end relative to said control-housing sheath such that a user's free hand can grip said stabilizer handle in a manner that puts that hand substantially orthogonal in orientation as compared to the hand gripping said grip-controller assembly within said control-housing sheath.

89. The method of claim 80, wherein said sheath-to-user-arm-securing device comprises a set of securing straps secured that can be tightened by a user by a means selected from the group consisting of a hook-and-loop mating configuration, a buckle-and-strap configuration, and a ratchet strap with a quick-release device.

90. The method of claim 80, further comprising the step of providing internal padding in said control-housing sheath for user comfort and to ensure a snug and stable fit on a user's hand and wrist.

91. The method of claim 80, further comprising the step of providing at least one power-tool-work-area illumination lamp disposed at said operating end of said control-housing sheath.

92. The method of claim 91, wherein said at least one power-tool-work-area illumination lamp is automatically energized whenever a coupled power tool is energized.

93. The method of claim 91, wherein said at least one power-tool-work-area illumination lamp is energized only when said user manually operates a control switch disposed on said control-housing sheath that causes electrical current to flow through said at least one power-tool-work-area illumination lamp.

* * * * *